US012792657B2

(12) United States Patent
Pattnayak et al.

(10) Patent No.: US 12,792,657 B2
(45) Date of Patent: Nov. 10, 2026

(54) LABEL-INFUSED DORMANT TOPIC CLUSTERING ON CUSTOMER SUPPORT REQUESTS USING LABELS FROM DISPARATE SOURCES

(71) Applicant: Oracle International Corporation, Redwood Shores, CA (US)

(72) Inventors: Priyaranjan Pattnayak, Snohomish, WA (US); Subramanyam Iyer, Pleasanton, CA (US); Hussain Bohra, Chicago, IL (US); Prosenjit Ghosh, Bengaluru (IN); Ranip Hore, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/740,883

(22) Filed: Jun. 12, 2024

(65) Prior Publication Data

US 2025/0384076 A1 Dec. 18, 2025

(51) Int. Cl.
*G06F 16/355* (2025.01)

(52) U.S. Cl.
CPC .................................. *G06F 16/355* (2019.01)

(58) Field of Classification Search
None
See application file for complete search history.

(56) References Cited

U.S. PATENT DOCUMENTS 9,558,259 B2 * 1/2017 Gallivan ............... G06F 16/355
10,740,482 B2 8/2020 Kulkarni et al.
11,049,028 B1 * 6/2021 Beskales ................ G06N 20/00
11,706,207 B1 7/2023 Fynaardt
2005/0289228 A1 * 12/2005 Srikanth ............. H04L 41/0866 709/220
2009/0070325 A1 3/2009 Gabriel et al.
2009/0092112 A1 4/2009 Kim et al.
2012/0162349 A1 6/2012 Alexandrov et al.
2016/0224502 A1 8/2016 Palmer et al.
2019/0034519 A1 1/2019 Xu et al.
2022/0188288 A1 6/2022 Dereszynski et al.
(Continued)

FOREIGN PATENT DOCUMENTS

WO 2024/163363 A1 8/2024

OTHER PUBLICATIONS

"Automated Identification of Customer Pain Points by Clustering Support Requests," PRFAQ, Feb. 2022, 6 pages.
(Continued)

*Primary Examiner* — Scott A. Waldron
(74) *Attorney, Agent, or Firm* — Invoke

(57) ABSTRACT

Techniques for locking and unlocking clusters of content items are disclosed. A clustering algorithm is executed to assign content items to corresponding clusters. A lock is then applied to the clusters, ensuring that content items associated with the locked clusters will not be reassigned to a new cluster while the cluster is in a locked state. Characteristics associated with the first clustering algorithm, the set of clusters, and/or the content items are monitored for cluster unlocking criteria. After determining that cluster unlocking criteria has been met for a cluster, the cluster is unlocked. The clustering algorithm is then applied to content items from the unlocked cluster.

33 Claims, 6 Drawing Sheets

(56) References Cited

U.S. PATENT DOCUMENTS

| | | | |
|---|---|---|---|
| 2022/0245340 | A1 | 8/2022 | Yang et al. |
| 2022/0292352 | A1 | 9/2022 | Jourdan et al. |
| 2022/0398230 | A1 | 12/2022 | Sinha et al. |
| 2023/0120358 | A1 | 4/2023 | Shaffer et al. |
| 2023/0131495 | A1 | 4/2023 | Tater et al. |
| 2023/0409222 | A1 | 12/2023 | Somech et al. |
| 2024/0095491 | A1 | 3/2024 | Birru et al. |
| 2024/0411762 | A1 | 12/2024 | Wu et al. |
| 2025/0097171 | A1 | 3/2025 | Hu et al. |
| 2025/0173330 | A1 | 5/2025 | Durg et al. |
| 2025/0284922 | A1 | 9/2025 | Zhang et al. |
| 2025/0328364 | A1 | 10/2025 | Ioannides et al. |
| 2025/0371433 | A1 | 12/2025 | Bhat et al. |
| 2025/0378092 | A1 | 12/2025 | Ghalyan et al. |
| 2026/0057039 | A1 | 2/2026 | Woods |
| 2026/0080251 | A1 | 3/2026 | Wang et al. |
| 2026/0100921 | A1 | 4/2026 | Chen et al. |
| 2026/0187372 | A1 | 7/2026 | Dubey et al. |

OTHER PUBLICATIONS

Ackerman. M., et al., "Incremental clustering: The case for extra clusters," Advances in neural information processing systems, vol. 27, 2014, 9 pages.

Gu. B. et al., "Efficient Dynamic Clustering: Capturing patterns from historical cluster evolution," arXiv preprint arXiv, 2022, 5 pages.

Barbosa, Nathalie, et al., "A Novel algorithm for dynamic clustering: properties and performance," 15th IEEE International Conference on Machine Learning and Applications (ICMLA)., IEEE, 2016. 10 pages.

Shafeeq. A. et al., "Dynamic clustering of data with modified k-means algorithm," Proceedings of the 2012 conference on information and computer networks, vol. 27, 2012, pp. 221-225.

"Mixture of Expert Agents—Lyzr AI", Retrieved from https://www.lyzr.ai/blog/mixture-of-expert-agents/, Aug. 28, 2024, 9 Pages.

"Multi-agent Conversation Framework", Retrieved from https://microsoft.github.io/autogen/0.2/docs/Use-Cases/agent_chat/, Retrieved on May 19, 2025, pp. 1-6.

"Multi-AI Agent: Parallel processing and automatic summarization using multiple LLMs", Retrieved from https://medium.com/@astropomeai/multi-ai-agent-parallel-processing-and-automatic-summarization-using-multiple-llms-ad80f410ae21, Sep. 28, 2024, 11 Pages.

"The Fusion of A/B Testing and AI Agents", Retrieved from https://relevanceai.com/agent-templates-tasks/a-b-testing-ai-agents, Retrieved on May 19, 2025, pp. 1-9.

"The Multi-Agent Reasoning script creates an interactive chatbot experience where multiple AI agents collaborate through a structured reasoning process to provide optimal answers", Retrieved from https://community.openai.com/t/the-multi-agent-reasoning-script-creates-an-interactive-chatbot-experience-where-multiple-ai-agents-collaborate-through-a-structured-reasoning-process-to-provide-optimal-answers/962788, Oct. 1, 2024, pp. 1-10.

Arjun G., "Creating a Multi-Agent Chatbot Using AutoGen: An End-to-End Guide", Retrieved from https://blog.arjun-g.com/creating-a-multi-agent-chatbot-using-autogen-an-end-to-end-guide-78b6671a96b4 May 26, 2024, pp. 1-14.

Kalotra S., "A/B Testing Strategies for Chatbot Performance Optimization", Retrieved from https://www.signitysolutions.com/tech-insights/a/b-testing-strategies-for-chatbot, Nov. 21, 2023, 3 Pages.

Kim et al., "Prospector: Improving LLM Agents with Self-Asking and Trajectory Ranking", 2023, pp. 1-20.

Ramani et al., "Persuasion Games with Large Language Models", Sep. 2, 2024, 10 Pages.

Rasal et al., "Navigating complexity: orchestrated problem solving with multi-agent LLMs", Feb. 26, 2024, pp. 1-8.

Shi et al., "Wildfeedback: Aligning LLMs with in-situ user interactions and feedback", Aug. 28, 2024, pp. 1-24.

Verma A., "Orchestrating Intelligence: A Deep Dive into AI/ML Agents and Frameworks", Sep. 10, 2024, 16 Pages.

Zhao et al., "Automatic Model Selection with Large Language Models for Reasoning", Findings of the Association for Computational Linguistics: EMNLP 2023, Dec. 6-10, pp. 758-783.

* cited by examiner

LABEL-INFUSED DORMANT TOPIC CLUSTERING ON CUSTOMER SUPPORT REQUESTS USING LABELS FROM DISPARATE SOURCES

TECHNICAL FIELD

The present disclosure relates to the clustering of content items. In particular, the present disclosure relates to lockable clusters and label-based clustering techniques.

BACKGROUND

Clustering is a complex operation due to the inherent variability and diversity of data types and structures involved. The process requires algorithms to manage and interpret vast amounts of data that can include text, images, and multimedia. Data types carry their own set of features and patterns that complicate the clustering task. Moreover, the dimensionality of the data can be exceedingly high, and handling such high-dimensional spaces efficiently is a non-trivial challenge that necessitates advanced computational techniques and resources.

An example that demonstrates the complexity of clustering algorithms is apparent in the clustering of support tickets in customer service systems. These algorithms categorize tickets based on the nature of customer queries that can vary widely from technical issues to billing inquiries. The textual data in support tickets often contains industry-specific jargon, abbreviations, and varied expressions of similar issues, making it challenging for clustering algorithms to accurately group related tickets. For instance, two tickets stating "phone won't charge" and "battery issues" require the algorithm to recognize these as related despite the different wording. The choice of features used to represent the data, the scale at which the data is analyzed, and the similarity metrics employed are important to the success of the clustering method used. Additionally, the presence of noise and outliers in the data can significantly skew results. The initial conditions and the number of clusters assumed can also dramatically affect the outcome, making the clustering process sensitive to these parameters.

Common clustering methods include k-means clustering, hierarchical clustering, and DBSCAN (Density-Based Spatial Clustering of Applications with Noise). K-means clustering partitions data into k predefined distinct non-overlapping subgroups based on the mean distance from the centroid of the clusters. Hierarchical clustering builds a tree of clusters and does not require a predefined number of clusters. DBSCAN groups points that are closely packed together, marking as outliers points that lie alone in low-density regions. Methods have their own strengths and application scenarios that dictate its use in specific contexts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 2:
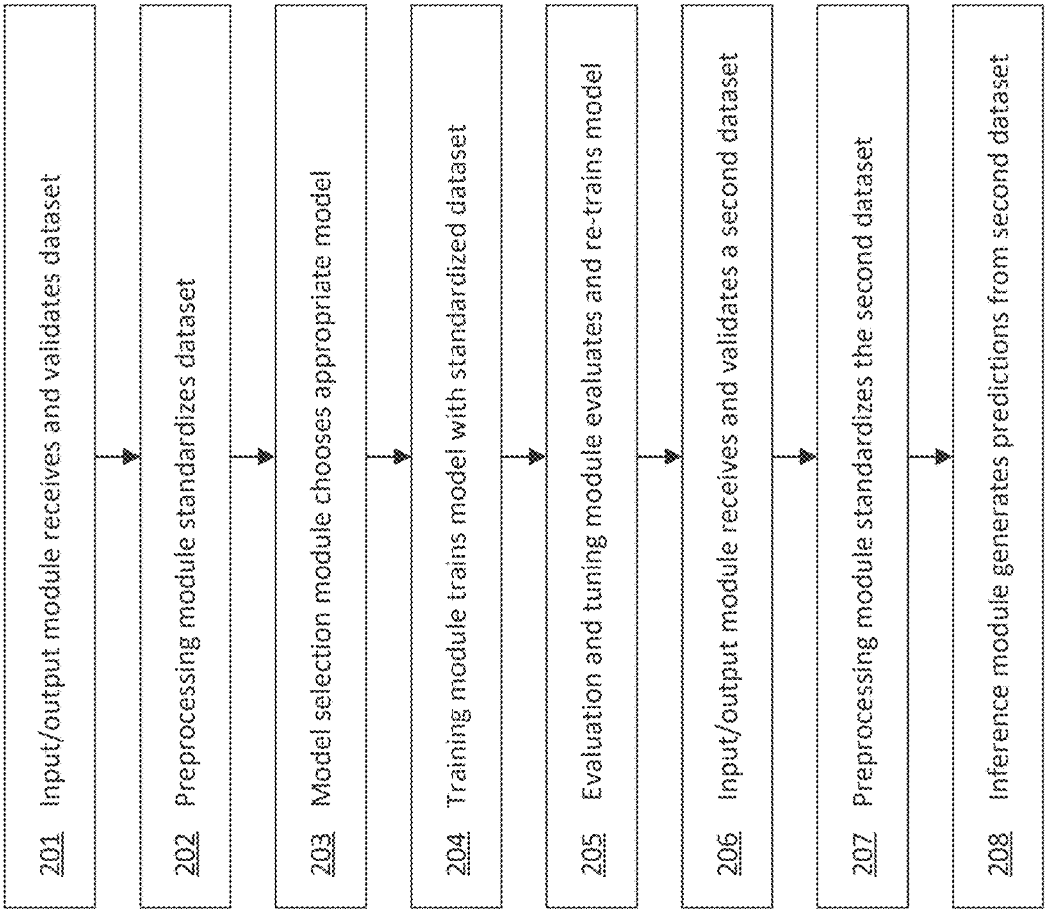
FIG. 2 illustrates the operation of a machine learning engine in one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. MACHINE LEARNING ARCHITECTURE
3. CLUSTERING WITH DYNAMICALLY LOCKING CLUSTERS
4. LABEL-AUGMENTED CONTENT CLUSTERING
5. DYNAMICALLY GENERATING CLUSTERS
6. COMPUTER NETWORKS AND CLOUD NETWORKS
7. HARDWARE OVERVIEW
8. MISCELLANEOUS; EXTENSIONS

1. General Overview

Clustering techniques are often used to group content items, such as documents, images, support tickets, and other data. Clustering algorithms are inherently dynamic in nature and iteratively refine cluster assignments. As new data is introduced, clustering algorithms make changes to clusters to reflect these changes. This ongoing adjustment can lead to inconsistency in cluster composition over time, where similar data points may shift between different clusters across successive iterations.

One or more embodiments lock and unlock clusters during execution of a clustering algorithm that assigns content items to clusters. When a cluster is in an unlocked state, content items that have been assigned to the cluster may be reassigned to other clusters. When a cluster is in a locked state, content items that have been assigned to the cluster may not be reassigned to other clusters. The system switches between locked and unlocked states for a cluster to provide some stability for the composition of the cluster while also providing some flexibility to modify the cluster when the modification is suitable.

Locking and unlocking operations may be executed on a portion of available clusters or globally on all available clusters. Accordingly, the system may execute the clustering algorithm when some clusters are in a locked state while other clusters are in an unlocked state. The system triggers the locking and unlocking operations based on evaluation of locking criteria and unlocking criteria, respectively.

The system may select and/or modify any combination of unlocking and locking criteria for use with the clustering algorithm. In an example, an unlocking criterion includes a number of content items in a particular cluster exceeding a particular threshold value. In another example, content items may be removed altogether from a system resulting in a reduction of content items within a locked cluster. If the number of content items left in a cluster falls below a particular threshold value, the system determines that a cluster unlocking criteria has been met. In another example, the system compares a current centroid for a cluster to an initial centroid for a cluster when the cluster was locked. If the difference between the current centroid and the initial centroid meets a drift criteria, the system determines that a cluster unlocking criteria has been met for the cluster.

In an example, the system determines that a locking criteria has been met for a cluster when the cluster reaches a particular size. The system may determine that a locking criteria has been met when a centroid for the cluster remains within a particular range for a period of time. The system may determine that a locking criteria has been met when a particular set of content items have been assigned to respective clusters. The system may determine that a locking criteria has been met when the total number of clusters reaches a particular threshold value.

In an example, the system first executes a clustering algorithm in an unlocked state to assign content items in an initial set of content items to respective clusters in a first set of clusters. While executing the clustering algorithm in the unlocked state, a content item in the initial set of content items may be assigned to a particular cluster and thereafter reassigned to another cluster. After the initial set of content items have been assigned to generate the first set of clusters, the system applies a lock to the first set of clusters. When the first set of clusters are locked, the initial set of content items that have now been assigned one of the first set of clusters cannot be reassigned to other clusters. The system continues to execute the clustering algorithm to assign new content items to respective clusters. As the clustering algorithm is being executed for assignment of the new content items, the system monitors the clusters for criteria that trigger locking or unlocking of clusters. When locking criteria or unlocking criteria are met, the system executes the locking operations or unlocking operations, respectively.

In an example, the system generates a vector for each content item of a set of content items. The vectors are representative of the corresponding content item and are based on a set of attributes associated with the corresponding content item. A clustering algorithm then uses the vectors to determine which cluster the content items should be assigned to. One or more content items may have a corresponding label that is different from the vector associated with the corresponding content item. In an example, a particular content item has a corresponding vector and a corresponding label. The system may determine that the label associated with the particular content item matches a label associated with a content item that is already assigned to a particular cluster. Based in part on the match, the system may assign the particular content item to the particular cluster.

One or more embodiments described in this Specification and/or recited in the claims may not be included in this General Overview section.

2. Machine Learning Architecture

Figure 1:
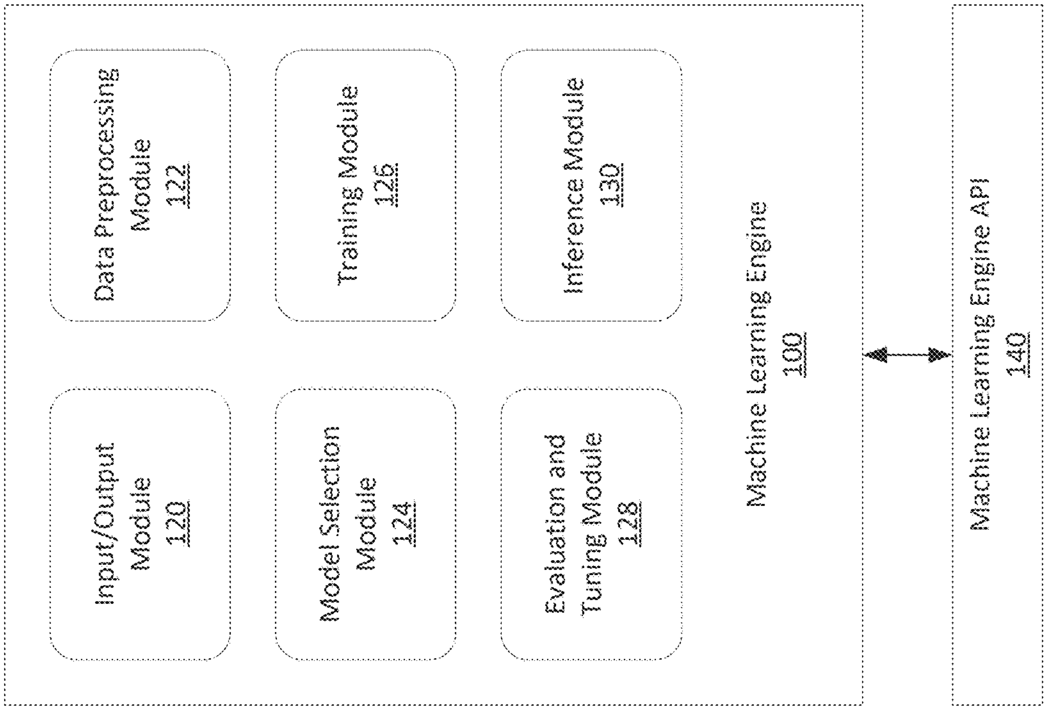
FIG. 1 illustrates a machine learning engine 100 in accordance with one or more embodiments.

FIG. 1 illustrates a machine learning engine 100 in accordance with one or more embodiments. As illustrated in FIG. 1, machine learning engine 100 includes input/output module 120, data preprocessing module 122, model selection module 124, training module 126, evaluation and tuning module 128, and inference module 130.

In accordance with an embodiment, input/output module 120 serves as the primary interface for data entering and exiting the system, managing the flow and integrity of data. This module may accommodate a wide range of data sources and formats to facilitate integration and communication within the machine learning architecture.

In an embodiment, an input handler within input/output module 120 includes a data ingestion framework capable of interfacing with various data sources, such as databases, APIs, file systems, and real-time data streams. This framework is equipped with functionalities to handle different data formats (e.g., CSV, JSON, XML) and efficiently manage large volumes of data. It includes mechanisms for batch and real-time data processing that enable the input/output module 120 to be versatile in different operational contexts, whether processing historical datasets or streaming data.

In accordance with an embodiment, input/output module 120 manages data integrity and quality as it enters the system by incorporating initial checks and validations. These checks and validations ensure that incoming data meets predefined quality standards, like checking for missing values, ensuring consistency in data formats, and verifying data ranges and types. This proactive approach to data quality minimizes potential errors and inconsistencies in later stages of the machine learning process.

In an embodiment, an output handler within input/output module 120 includes an output framework designed to handle the distribution and exportation of outputs, predictions, or insights. Using the output framework, input/output module 120 formats these outputs into user-friendly and accessible formats, such as reports, visualizations, or data files compatible with other systems. Input/output module 120 also ensures secure and efficient transmission of these outputs to end-users or other systems in an embodiment and may employ encryption and secure data transfer protocols to maintain data confidentiality.

In accordance with an embodiment, data preprocessing module 122 transforms data into a format suitable for use by other modules in machine learning engine 100. For example, data preprocessing module 122 may transform raw data into a normalized or standardized format suitable for training ML models and for processing new data inputs for inference. In an embodiment, data preprocessing module 122 acts as a bridge between the raw data sources and the analytical capabilities of machine learning engine 100.

In an embodiment, data preprocessing module 122 begins by implementing a series of preprocessing steps to clean, normalize, and/or standardize the data. This involves handling a variety of anomalies, such as managing unexpected data elements, recognizing inconsistencies, or dealing with missing values. Some of these anomalies can be addressed through methods like imputation or removal of incomplete records, depending on the nature and volume of the missing data. Data preprocessing module 122 may be configured to handle anomalies in different ways depending on context.

Data preprocessing module 122 also handles the normalization of numerical data in preparation for use with models sensitive to the scale of the data, like neural networks and distance-based algorithms. Normalization techniques, such as min-max scaling or z-score standardization, may be applied to bring numerical features to a common scale, enhancing the model's ability to learn effectively.

In an embodiment, data preprocessing module 122 includes a feature encoding framework that ensures categorical variables are transformed into a format that can be easily interpreted by machine learning algorithms. Techniques like one-hot encoding or label encoding may be employed to convert categorical data into numerical values, making them suitable for analysis. The module may also include feature selection mechanisms, where redundant or irrelevant features are identified and removed, thereby increasing the efficiency and performance of the model.

In accordance with an embodiment, when data preprocessing module 122 processes new data for inference, data preprocessing module 122 replicates the same preprocessing steps to ensure consistency with the training data format. This helps to avoid discrepancies between the training data format and the inference data format, thereby reducing the likelihood of inaccurate or invalid model predictions.

In an embodiment, model selection module 124 includes logic for determining the most suitable algorithm or model architecture for a given dataset and problem. This module operates in part by analyzing the characteristics of the input data, such as its dimensionality, distribution, and the type of problem (classification, regression, clustering, etc.).

In an embodiment, model selection module 124 employs a variety of statistical and analytical techniques to understand data patterns, identify potential correlations, and assess the complexity of the task. Based on this analysis, it then matches the data characteristics with the strengths and weaknesses of various available models. This can range from simple linear models for less complex problems to sophisticated deep learning architectures for tasks requiring feature extraction and high-level pattern recognition, such as image and speech recognition.

In an embodiment, model selection module 124 utilizes techniques from the field of Automated Machine Learning (AutoML). AutoML systems automate the process of model selection by rapidly prototyping and evaluating multiple models. They use techniques like Bayesian optimization, genetic algorithms, or reinforcement learning to explore the model space efficiently. Model selection module 124 may use these techniques to evaluate each candidate model based on performance metrics relevant to the task. For example, accuracy, precision, recall, or F1 score may be used for classification tasks and mean squared error metrics may be used for regression tasks. Accuracy measures the proportion of correct predictions (both positive and negative). Precision measures the proportion of actual positives among the predicted positive cases. Recall (also known as sensitivity) evaluates how well the model identifies actual positives. F1 Score is a single metric that accounts for both false positives and false negatives. The mean squared error (MSE) metric may be used for regression tasks. MSE measures the average squared difference between the actual and predicted values, providing an indication of the model's accuracy. A lower MSE may indicate a model's greater accuracy in predicting values, as it represents a smaller average discrepancy between the actual and predicted values.

In accordance with an embodiment, model selection module 124 also considers computational efficiency and resource constraints. This is meant to help ensure the selected model is both accurate and practical in terms of computational and time requirements. In an embodiment, certain features of model selection module 124 are configurable such as a configured bias toward (or against) computational efficiency.

In accordance with an embodiment, training module 126 manages the 'learning' process of ML models by implementing various learning algorithms that enable models to identify patterns and make predictions or decisions based on input data. In an embodiment, the training process begins with the preparation of the dataset after preprocessing; this involves splitting the data into training and validation sets. The training set is used to teach the model, while the validation set is used to evaluate its performance and adjust parameters accordingly. Training module 126 handles the iterative process of feeding the training data into the model, adjusting the model's internal parameters (like weights in neural networks) through backpropagation and optimization algorithms, such as stochastic gradient descent or other algorithms providing similarly useful results.

In accordance with an embodiment, training module 126 manages overfitting, where a model learns the training data too well, including its noise and outliers, at the expense of its ability to generalize to new data. Techniques such as regularization, dropout (in neural networks), and early stopping are implemented to mitigate this. Additionally, the module employs various techniques for hyperparameter tuning; this involves adjusting model parameters that are not directly learned from the training process, such as learning rate, the number of layers in a neural network, or the number of trees in a random forest.

In an embodiment, training module 126 includes logic to handle different types of data and learning tasks. For instance, it includes different training routines for supervised learning (where the training data comes with labels) and unsupervised learning (without labeled data). In the case of deep learning models, training module 126 also manages the complexities of training neural networks that include initializing network weights, choosing activation functions, and setting up neural network layers.

In an embodiment, evaluation and tuning module 128 incorporates dynamic feedback mechanisms and facilitates continuous model evolution to help ensure the system's relevance and accuracy as the data landscape changes. Evaluation and tuning module 128 conducts a detailed evaluation of a model's performance. This process involves using statistical methods and a variety of performance metrics to analyze the model's predictions against a validation dataset. The validation dataset, distinct from the training set, is instrumental in assessing the model's predictive accuracy and its capacity to generalize beyond the training data. The module's algorithms meticulously dissect the model's output, uncovering biases, variances, and the overall effectiveness of the model in capturing the underlying patterns of the data.

In an embodiment, evaluation and tuning module 128 performs continuous model tuning by using hyperparameter optimization. Evaluation and tuning module 128 performs an exploration of the hyperparameter space using algorithms, such as grid search, random search, or more sophisticated methods like Bayesian optimization. Evaluation and tuning module 128 uses these algorithms to iteratively adjust and refine the model's hyperparameters—settings that govern the model's learning process but are not directly learned from the data—to enhance the model's performance. This tuning process helps to balance the model's complexity with its ability to generalize and attempts to avoid the pitfalls of underfitting or overfitting.

In an embodiment, evaluation and tuning module 128 integrates data feedback and updates the model. Evaluation and tuning module 128 actively collects feedback from the model's real-world applications, an indicator of the model's performance in practical scenarios. Such feedback can come from various sources depending on the nature of the application. For example, in a user-centric application like a recommendation system, feedback might comprise user interactions, preferences, and responses. In other contexts, such as predicting events, it might involve analyzing the model's prediction errors, misclassifications, or other performance metrics in live environments.

In an embodiment, feedback integration logic within evaluation and tuning module 128 integrates this feedback using a process of assimilating new data patterns, user interactions, and error trends into the system's knowledge base. The feedback integration logic uses this information to identify shifts in data trends or emergent patterns that were not present or inadequately represented in the original training dataset. Based on this analysis, the module triggers a retraining or updating cycle for the model. If the feedback suggests minor deviations or incremental changes in data patterns, the feedback integration logic may employ incremental learning strategies, fine-tuning the model with the new data while retaining its previously learned knowledge. In cases where the feedback indicates significant shifts or the emergence of new patterns, a more comprehensive model updating process may be initiated. This process might involve revisiting the model selection process, re-evaluating the suitability of the current model architecture, and/or potentially exploring alternative models or configurations that are more attuned to the new data.

In accordance with an embodiment, throughout this iterative process of feedback integration and model updating, evaluation and tuning module 128 employs version control mechanisms to track changes, modifications, and the evolution of the model, facilitating transparency and allowing for rollback if necessary. This continuous learning and adaptation cycle, driven by real-world data and feedback, helps to endure the model's ongoing effectiveness, relevance, and accuracy.

In an embodiment, inference module 130 transforms data raw data into actionable, precise, and contextually relevant predictions. In addition to processing and applying a trained model to new data, inference module 130 may also include post-processing logic that refines the raw outputs of the model into meaningful insights.

In an embodiment, inference module 130 includes classification logic that takes the probabilistic outputs of the model and converts them into definitive class labels. This process involves an analytical interpretation of the probability distribution for each class. For example, in binary classification, the classification logic may identify the class with a probability above a certain threshold, but classification logic may also consider the relative probability distribution between classes to create a more nuanced and accurate classification.

In an embodiment, inference module 130 transforms the outputs of a trained model into definitive classifications. Inference module 130 employs the underlying model as a tool to generate probabilistic outputs for each potential class. It then engages in an interpretative process to convert these probabilities into concrete class labels.

In an embodiment, when inference module 130 receives the probabilistic outputs from the model, it analyzes these probabilities to determine how they are distributed across some or every potential class. If the highest probability is not significantly greater than the others, inference module 130 may determine that there is ambiguity or interpret this as a lack of confidence displayed by the model.

In an embodiment, inference module 130 uses thresholding techniques for applications where making a definitive decision based on the highest probability might not suffice due to the critical nature of the decision. In such cases, inference module 130 assesses if the highest probability surpasses a certain confidence threshold that is predetermined based on the specific requirements of the application. If the probabilities do not meet this threshold, inference module 130 may flag the result as uncertain or defer the decision to a human expert. Inference module 130 dynamically adjusts the decision thresholds based on the sensitivity and specificity requirements of the application, subject to calibration for balancing the trade-offs between false positives and false negatives.

In accordance with an embodiment, inference module 130 contextualizes the probability distribution against the backdrop of the specific application. This involves a comparative analysis, especially in instances where multiple classes have similar probability scores, to deduce the most plausible classification. In an embodiment, inference module 130 may incorporate additional decision-making rules or contextual information to guide this analysis, ensuring that the classification aligns with the practical and contextual nuances of the application.

In regression models, where the outputs are continuous values, inference module 130 may engage in a detailed scaling process in an embodiment. Outputs, often normalized or standardized during training for optimal model performance, are rescaled back to their original range. This rescaling involves recalibration of the output values using the original data's statistical parameters, such as mean and standard deviation, ensuring that the predictions are meaningful and comparable to the real-world scales they represent.

In an embodiment, inference module 130 incorporates domain-specific adjustments into its post-processing routine. This involves tailoring the model's output to align with specific industry knowledge or contextual information. For example, in financial forecasting, inference module 130 may adjust predictions based on current market trends, economic indicators, or recent significant events, ensuring that the outputs are both statistically accurate and practically relevant.

In an embodiment, inference module 130 includes logic to handle uncertainty and ambiguity in the model's predictions. In cases where inference module 130 outputs a measure of uncertainty, such as in Bayesian inference models, inference module 130 interprets these uncertainty measures by converting probabilistic distributions or confidence intervals into a format that can be easily understood and acted upon. This provides users with both a prediction and an insight into the confidence level of that prediction. In an embodiment, inference module 130 includes mechanisms for involving human oversight or integrating the instance into a feedback loop for subsequent analysis and model refinement.

In an embodiment, inference module 130 formats the final predictions for end-user consumption. Predictions are converted into visualizations, user-friendly reports, or interactive interfaces. In some systems, like recommendation engines, inference module 130 also integrates feedback mechanisms, where user responses to the predictions are used to continually refine and improve the model, creating a dynamic, self-improving system.

FIG. 2 illustrates the operation of a machine learning engine in one or more embodiments. At step 1, input/output module 120 receives a dataset intended for training. This data can originate from diverse sources, like databases or real-time data streams, and in varied formats, such as CSV, JSON, or XML. Input/output module 120 assesses and validates the data, ensuring its integrity by checking for consistency, data ranges, and types.

At step 2, training data is passed to data preprocessing module 122. Here, the data undergoes a series of transformations to standardize and clean it, making it suitable for training ML models. This involves normalizing numerical data, encoding categorical variables, and handling missing values through techniques like imputation.

At step 3, prepared data from the data preprocessing module 122 is then fed into model selection module 124. This module analyzes the characteristics of the processed data, such as dimensionality and distribution, and selects the most appropriate model architecture for the given dataset and problem. It employs statistical and analytical techniques to match the data with an optimal model, ranging from simpler models for less complex tasks to more advanced architectures for intricate tasks.

At step 4, training module 126 trains the selected model with the prepared dataset. It implements learning algorithms to adjust the model's internal parameters, optimizing them to identify patterns and relationships in the training data. Training module 126 also addresses the challenge of overfitting by implementing techniques, like regularization and early stopping, ensuring the model's generalizability.

At step 5, evaluation and tuning module 128 evaluates the trained model's performance using the validation dataset. Evaluation and tuning module 128 applies various metrics to assess predictive accuracy and generalization capabilities. It then tunes the model by adjusting hyperparameters, and if needed, incorporates feedback from the model's initial deployments, retraining the model with new data patterns identified from the feedback.

At step 6, input/output module 120 receives a dataset intended for inference. Input/output module 120 assesses and validates the data.

At step content item, data preprocessing module 122 receives the validated dataset intended for inference. Data preprocessing module 122 ensures that the data format used in training is replicated for the new inference data, maintaining consistency and accuracy for the model's predictions.

At step 8, inference module 130 processes the new data set intended for inference, using the trained and tuned model. It applies the model to this data, generating raw probabilistic outputs for predictions. Inference module 130 then executes a series of post-processing steps on these outputs, such as converting probabilities to class labels in classification tasks or rescaling values in regression tasks. It contextualizes the outputs as per the application's requirements, handling any uncertainty in predictions and formatting the final outputs for end-user consumption or integration into larger systems.

In an embodiment, machine learning engine API 140 allows for applications to leverage machine learning engine 100. In an embodiment, machine learning engine API 140 may be built on a RESTful architecture and offer stateless interactions over standard HTTP/HTTPS protocols. Machine learning engine API 140 may feature a variety of endpoints, each tailored to a specific function within machine learning engine 100. In an embodiment, endpoints such as /submitData facilitate the submission of new data for processing, while /retrieveResults is designed for fetching the outcomes of data analysis or model predictions. The MLE API may also include endpoints like /updateModel for model modifications and /trainModel to initiate training with new datasets.

In an embodiment, machine learning engine API 140 is equipped to support SOAP-based interactions. This extension involves defining a WSDL (Web Services Description Language) document that outlines the API's operations and the structure of request and response messages. In an embodiment, machine learning engine API 140 supports various data formats and communication styles. In an embodiment, machine learning engine API 140 endpoints may handle requests in JSON format or any other suitable format. For example, machine learning engine API 140 may process XML, and it may also be engineered to handle more compact and efficient data formats, such as Protocol Buffers or Avro, for use in bandwidth-limited scenarios.

In an embodiment, machine learning engine API 140 is designed to integrate WebSocket technology for applications necessitating real-time data processing and immediate feedback. This integration enables a continuous, bi-directional communication channel for a dynamic and interactive data exchange between the application and machine learning engine 100.

2. Cluster Management Architecture

Figure 3:
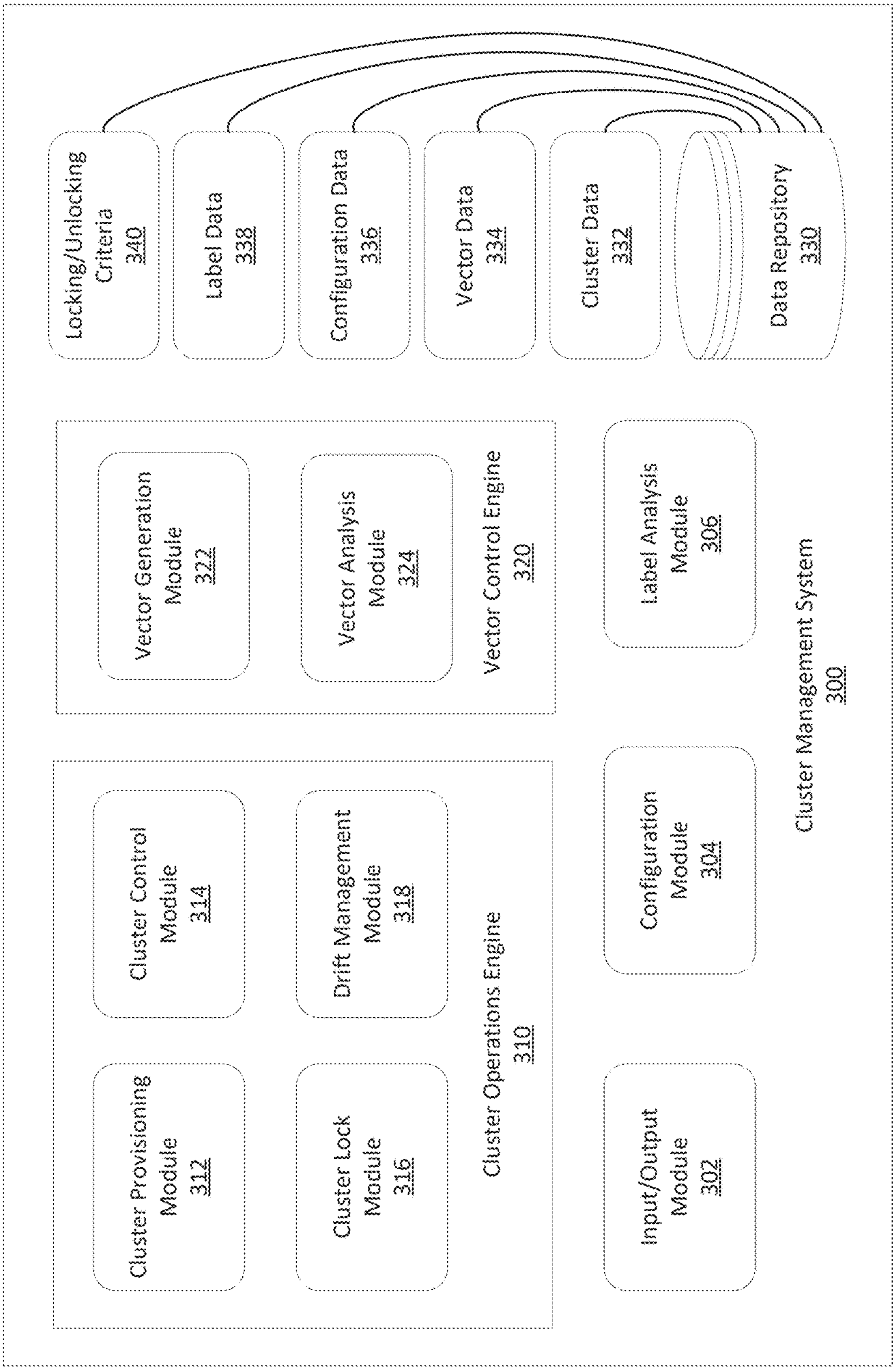
FIG. 3 illustrates a cluster management system 300 in accordance with one or more embodiments.

FIG. 3 illustrates a cluster management system 300 in accordance with one or more embodiments. As illustrated in FIG. 3, system 300 includes input/output module 302, configuration module 304, label analysis module 306, cluster operations engine 310, vector control engine 320, and data repository 330. Cluster operations engine 310 includes cluster provisioning module 312, cluster control module 314, cluster lock module 316, and drift management module 318. Vector control engine 320 includes vector generation module 322 and vector analysis module 324. Data repository 330 includes cluster data 332, vector data 334, configuration data 336, label data 338, and locking/unlocking criteria. In one or more embodiments, the cluster management system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component.

In accordance with one or more embodiments, input/output module 302 is configured to manage data integrity and quality as it enters cluster management system 300 by incorporating initial checks and validations. These checks and validations ensure that incoming data meets predefined quality standards, like checking for missing values, ensuring consistency in data formats, and verifying data ranges and types. In accordance with one or more embodiments, input/output module 302 is configured to handle the distribution and exportation of outputs for consumption by other modules, systems, or users. For example, input/output module 302 may be configured to format outputs into user-friendly and accessible formats, such as reports, visualizations, or data files compatible with other systems. Input/output module 302 also ensures secure and efficient transmission of these outputs to end-users or other systems in an embodiment and may employ encryption and secure data transfer protocols to maintain data confidentiality.

In accordance with one or more embodiments, configuration module 304 manages the configuration of cluster management system. Configuration module 304 may include one or more interfaces that allow users and/or systems to view or alter configuration data 336. Other modules in cluster operations engine 300 rely on configuration module 304 to access and provide accurate configuration data as needed. For example, a module within cluster operations engine 300 may need to access threshold information that indicates a maximum or minimum size of a cluster, maximum vector distance from the boundary of a cluster to a cluster centroid, weights given to labels used to influence clustering algorithms, or any other configuration-related information or data. Labels are data or metadata associated with content items that are meant to be used to classify content items. Labels are often manually associated with content items by human interaction, for example, by selecting an available label from a list of labels in a user interface or by manually typing the label. In an embodiment, cluster operations engine 310 may include a separate configuration module, and/or vector control module 320 may include a separate configuration module.

In accordance with one or more embodiments, label analysis module 306 is configured to analyze labels associated with various types of content items, including but not limited to documents, support tickets, images, text, and other forms of media. Label analysis module 306 is configured to work with labels that could be present in different formats across these media types. For example, support tickets may include one or more categorization labels that serve as a structured means to organize and classify the data within these tickets based on predefined categories. Label analysis module performs label matching in one or more embodiments.

In accordance with one or more embodiments, label analysis module 306 manages processes related to the extraction of labels from content items, the formatting of these labels into a consistent and standardized form, and the normalization of labels to ensure uniformity across different sources and types of content. Label analysis module 306 is also configured to perform label matching functions. For example, label analysis module 306 may compare extracted labels against a set of known labels to identify matches. Alternatively, label analysis module 306 may compare extracted labels with one another to identify potential groups of labels that are the same or similar to one another. The matching process in label analysis module 306 utilizes algorithms designed to facilitate the identification of similarities and differences among labels even when discrepancies in terminology or formatting exist.

In accordance with one or more embodiments, label analysis module 306 is configured to generate label data 338 that stores information related to extracted labels. For example, label analysis module 306 may generate and store mappings between extracted labels and expected labels. A label-to-content item mapping may also be stored. Label analysis module 306 may also store associations between labels and clusters. Mappings may be provisional mappings. For example, a mapping between a label (or content item) and a cluster may be a temporary mapping that could change as other information is collected or analyzed.

In accordance with one or more embodiments, label analysis module 306 is configured to perform analysis tasks associated with labels. For example, label analysis module 306 may analyze similarities between labels that do not exactly match one another and generate a likeness metric to indicate similarity. Label analysis module 306 may also analyze the labels associated with a particular cluster or labels associated with content items in a cluster. For example, label analysis module 306 may compare the vector distance between content items with labels or content items with a particular label. In an embodiment, label analysis module 306 calculates the vector distance between content items having similar labels based on a similarity score. The vector distances calculated in this manner may be used to determine a vector distance threshold (e.g., minimum, maximum, average) that can be used to determine a vector distance needed for a content item having a new label to be included in or excluded from the cluster.

In accordance with one or more embodiments, cluster operations engine 310 is configured to manage creating, destroying, expanding, shrinking, and locking/unlocking of clusters. In addition, cluster operations engine 310 monitors clusters and manages centroid drift associated with the clusters. Cluster operations engine 310 performs these operations using modules, including cluster provisioning module 312, cluster control module 314, cluster lock module 316, and drift management module 318.

In accordance with one or more embodiments, cluster provisioning module 312 is responsible for the creation and dissolution of clusters that organize various content items within a clustering system, such as support tickets, text files, images, and other media. Cluster provisioning module 312 establishes initial clusters based on various criteria, such as content similarity, content type, relevance, metadata, vector distance, and/or grouping items into meaningful categories. When a new cluster is formed, cluster provisioning module 312 sets the parameters for how content items should be grouped, considering factors like thematic similarity or specific tags. If clusters become unnecessary, for example, due to data retention and disposal policies or lack of usefulness as indicated by a trigger (e.g., centroid drift), cluster provisioning module 312 may dissolve clusters.

In accordance with one or more embodiments, cluster provisioning module 312 continuously evaluates the necessity to create new clusters as new types of content are introduced or as organizational needs evolve. When the need arises to disband a cluster, cluster provisioning module 312 manages the deconstruction process. Cluster provisioning module 312 ensures that content items previously assigned to the cluster are given an unassigned status, allowing other processes within cluster operations engine 310 to select an appropriate cluster for the unassigned content items or track them for eventual addition to a cluster. This involves updating the metadata associated with each content item to reflect their new status, ensuring that the integrity and traceability of content are maintained throughout their lifecycle within the system. In an embodiment, metadata associated with clusters and cluster membership may be stored as cluster data 332 in data repository 330.

In accordance with one or more embodiments, cluster control module 314 is configured to manage tasks associated with assigning content items to various clusters. For example, cluster control module 314 evaluates content items against the current cluster configurations and places items into the most appropriate cluster based on predefined criteria. These criteria often rely on different attributes, such as labels, metadata, or vectors, that represent attributes associated with the content item, ensuring that similar content items are clustered together for streamlined retrieval and analysis.

In accordance with one or more embodiments, cluster control module 314 monitors the size and relevance of clusters, adjusting them based on preconfigured thresholds. If a cluster becomes overly large, indicating a high concentration of similar content, cluster control module 314 may split the cluster to maintain manageable group sizes and improve accessibility. Conversely, if clusters become smaller or less relevant, the module might merge them with other similar clusters to optimize the structure and efficiency of the system.

In accordance with one or more embodiments, cluster control module 314 adapts to the dynamic nature of content clustering by refining the parameters and rules for content grouping as the volume and types of content change based on the configuration of cluster management system 300 stored in configuration data 336. This might include the use of machine learning algorithms to automate some decisions, helping the system adapt to new content types or shifts in organizational needs. This continuous refinement ensures that the system remains effective in managing and accessing content as the organization's information landscape evolves.

In accordance with one or more embodiments, cluster control module 314 employs DBSCAN (Density-Based Spatial Clustering of Applications with Noise) to assign content items to clusters using numerical vectors created using techniques such as TF-IDF or BERT embeddings. The cluster control module 314 initializes DBSCAN with preconfigured parameters such as eps (i.e., epsilon, representing the maximum radius of a neighborhood around a point) and minPts (i.e., the minimum number of points required to form a cluster). Cluster control module 314 starts by selecting an arbitrary content item and retrieving its neighborhood, defined by the eps distance.

In accordance with one or more embodiments, if the selected content item is a core point, having at least minPts neighbors within the eps distance, it is marked as part of a new cluster. Cluster control module 314 then iteratively examines each neighbor of the core point. If a neighbor is also a core point, the module further expands the cluster by including all density-reachable items from this neighbor. This expansion continues recursively until no more items can be added to the cluster. Cluster control module 314 marks the content items, differentiating between core points, border points, and noise points. Border points, which are within eps distance of core points but do not themselves have enough neighbors, are added to the existing cluster. Noise points, which do not fall within the eps distance of any core points and do not meet the minPts threshold, are labeled as outliers and not assigned to any cluster.

In accordance with one or more embodiments cluster control module 314 then proceeds to the next unvisited content item and repeats the clustering process. It continues this process until the desired selection of content items have been processed. The result is a set of clusters, each containing content items that are closely located in the feature space according to the DBSCAN parameters, with noise points identified as outliers.

In accordance with one or more embodiments, cluster lock module 316 is configured to lock and unlock clusters. When clusters are in a locked state, any content item that has been assigned to the locked cluster cannot be reassigned to another cluster. When clusters are in an unlocked state, content items that have been assigned to the unlocked cluster may be reassigned to another cluster or may be placed in an unclustered state (belonging to no cluster). To lock or unlock a cluster, cluster lock module 316 updates metadata associated with the cluster stored in cluster data 332.

In accordance with one or more embodiments, cluster lock module 316 relies on locking triggers to determine when to lock a cluster. Likewise, cluster lock module 316 relies on unlocking triggers to determine when to unlock a cluster. Locking and unlocking triggers are also referred to herein as locking and unlocking criteria and the criteria may not immediately trigger a locking or unlocking action in some instances. For example, locking criteria may be detected and analyzed in an embodiment before a lock is placed on a cluster. Locking and unlocking triggers may be detected by performing an analysis of the state of a cluster. Cluster lock module 316 continually monitors data related to clusters and content items to detect locking and unlocking triggers in an embodiment. In one or more embodiments, cluster lock module 316 may receive explicit instructions from a user or a service to lock or unlock a cluster. In accordance with one or more embodiments, locking and unlocking triggers or criteria are stored as locking/unlocking criteria 340 in data repository 330.

In accordance with one or more embodiments, drift management module 318 is configured to monitor, detect, and manage cluster centroid drift. For example, as content items are added to a cluster, the cluster centroid may be recalculated to account for the change in the vector makeup of the cluster. In an embodiment, content items may be added to locked clusters, so a cluster centroid may change even if the cluster is locked. Drift management module 318 calculates the cluster centroid and stores the cluster centroid vector in cluster data 332. Drift management module 318 maintains the starting cluster centroid vector in cluster data 332 in an embodiment and may also maintain each subsequent (altered) cluster centroid in cluster data 332.

In accordance with one or more embodiments, drift management module 318 is configured to monitor centroid drift by comparing the current centroid vector for the cluster with a different centroid vector for the cluster, such as the starting centroid vector or an intervening centroid vector. In one or more embodiments, drift management module 318 is configured to calculate a vector distance between the vectors to determine if the centroid has drifted beyond an acceptable preconfigured threshold. Centroid drift can be calculated in multiple ways. For example, centroid drift may be calculated as a difference between the starting vector and the current vector or over time to determine a rate of centroid drift. If a centroid has not drifted beyond the acceptable threshold but the drift rate changes dramatically, an alert may be triggered to indicate that the breach of a centroid drift threshold is imminent. Drift management module 318 may perform vector-related calculations or may rely on vector analysis module 324 to perform vector-related calculations in an embodiment.

In accordance with one or more embodiments, vector control engine 320 is configured to create, manage, analyze, and perform other actions associated with vectors. In an embodiment, vector control engine 320 is responsible for maintaining consistency in vector structure and for ensuring that vector generation is performed using the appropriate statistical models, algorithms, and machine learning models. Vector control engine 320 includes vector generation module 322 and vector analysis module 324.

In accordance with one or more embodiments, vector generation module 322 is configured to generate vectors for content items. Vector generation module 322 operates by analyzing the attributes of content items to produce representative vectors. This module scans each item, extracting relevant features, such as text metadata, image properties, or audio frequencies. These features are then processed using mathematical models that may involve algorithms, such as principal component analysis or neural networks, to generate a vector that encapsulates the characteristics of the item in a multidimensional space. The output vectors are used in various applications, including similarity assessment by vector analysis module 324, where they help to determine how closely related different content items are based on their underlying attributes.

The effectiveness of the module depends on the precision of the feature extraction and the robustness of the algorithm applied. In accordance with one or more embodiments, vector generation module 322 uses term frequency-inverse document frequency (TF-IDF) to generate vectors. TF-IDF begins by calculating the Term Frequency (TF) for each word in each content item. The calculation involves dividing the count of a specific term in the content item by the total number of terms in that content item. This frequency is then adjusted by the Inverse Document Frequency (IDF), computed by taking the logarithm of the ratio of the total number of content items in the corpus to the number of content items containing the term. More specifically, IDF is calculated using the formula IDF (w)=log(N/n(w)), where N is the total number of content items, and n(w) is the number of content items containing the word w.

The TF and IDF values are multiplied to produce the TF-IDF score that quantifies the relevance of a word within a specific content item relative to its commonness across content items. This score is then used by vector generation module 322 to construct a vector for each content item, where each dimension of the vector represents a unique term from the corpus, and the magnitude of each dimension corresponds to the TF-IDF score of the term in that content item. The resulting vectors serve as numeric representations of the content items, enabling further analysis used for clustering or classification.

In accordance with one or more embodiments, vector generation module uses BERT (Bidirectional Encoder Representations from Transformers) scores. BERT may be used to create vectors by first tokenizing the input text using sub-word units, which helps in handling rare and out-of-vocabulary words. Special tokens such as [CLS] and [September] are added to mark the beginning and end of sentences. The tokenized input is then converted into embeddings through an embedding layer that includes token embeddings, segment embeddings, and position embeddings. These embeddings are fed into the BERT model, which consists of multiple layers of transformers. Each transformer layer applies self-attention mechanisms and feedforward neural networks to produce contextualized representations of the tokens. The output of the BERT model is a set of hidden states for each token at each layer.

To obtain a single vector representation for a document, the hidden states can be aggregated in several ways. One approach is to use the embedding of the [CLS] token, which is intended to capture the overall meaning of the input sequence. Another method is to perform mean pooling, where the embeddings of all tokens in the sequence are averaged. Alternatively, max pooling can be used, taking the maximum value across the token embeddings. Resulting vectors are dense representations with contextual information. These vectors can then be used for various downstream tasks such as clustering based on semantic similarities and differences between documents.

In accordance with one or more embodiments, BERT and TF-IDF may be used together to leverage both contextual and term-frequency information to create robust document vectors. TF-IDF captures the importance of individual terms within documents and across the corpus, providing a sparse vector representation that highlights significant terms. BERT embeddings provide dense, contextually enriched representations of the text. By concatenating the TF-IDF vectors with the BERT embeddings, a combined feature set may be created that encapsulates both the statistical importance of terms and their contextual semantics. This hybrid approach may enhance clustering accuracy for some content items.

In accordance with one or more embodiments, vector analysis module 324 is configured to analyze vectors associated with content items. Vector analysis module 324 generates similarity scores and other metrics that are used by cluster operations engine 310 to determine content items that should be associated with a cluster. For example, vector analysis module 324 may compart vectors using cosign similarity. Cosine similarity is calculated based on the dot product of the vectors and the magnitudes of each vector. The dot product is calculated by multiplying corresponding components of the vectors, summing those products, and then multiplying the result by the cosine of the angle between the vectors. Vector analysis module 324 may also convert the cosine similarity score between two vectors to a distance measurement between the two vectors using the formula d(p,q)=1−similarity(p,q).

In accordance with one or more embodiments, vector analysis module 324 tracks vector-related metrics, such as vector similarity metrics and vector distance metrics, in vector data 334. In an embodiment, vector-related metrics are mapped to content item identifiers and/or content item vectors used to generate the particular vector-related metric. In accordance with one or more embodiments, vector data 334 is updated when changes are made to vectors in a cluster. For example, if a new content item is added to a cluster, a vector regeneration process may be triggered if new dimensions are added to the standard vector for the cluster or corpus (e.g., if new words are found in the content item). Vector generation module 322 may regenerate vectors for items in the cluster, and vector analysis module 324 may update vector similarity and distance metrics.

In accordance with one or more embodiments, an initial vector structure is not altered even if a content item with new features is added to the corpus or to a cluster. An advantage to locking the vector structure when clusters are first formed is that it allows a new content item to be easily compared to the content items in each cluster without re-generating vectors for the content items and without re-calculating similarity and distance metrics for each content item. In an embodiment, a vector structure lock is put in place when any of the clusters in a set of clusters is locked. The vector structure lock may be removed manually or automatically if the clusters are unlocked. This allows for a consistent vector structure across clusters. In an embodiment, cluster locking and vector structure locking are independent from one another.

In accordance with one or more embodiments, data repository 330 is configured to store data used by cluster management system 300. Data repository 330 includes cluster data 332, vector data 334, configuration data 336, and label data 338. In one or more embodiments, a data repository 330 is any type of storage unit and/or device (e.g., a file system, database, collection of tables, or any other storage mechanism) for storing data. Furthermore, data repository 330 may include multiple different storage units and/or devices. The multiple different storage units and/or devices may or may not be of the same type or located at the same physical site. In addition, data repository 330 may be implemented or executed on the same computing system as cluster management system 300. Additionally, or alternatively, data repository 330 may be implemented or executed on a computing system separate from cluster management system 300. Data repository 330 may be communicatively coupled to cluster management system 300 via a direct connection or via a network. Information describing cluster data 332, vector data 334, configuration data 336, and label data 338 may be implemented across any of components within the cluster management system 300. However, this information is illustrated within data repository 330 for purposes of clarity and explanation.

Additional embodiments and/or examples relating to computer networks are described below in Section 6, titled "Computer Networks and Cloud Networks."

In an embodiment, cluster management system 300 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, cluster management system 300 may include an interface (e.g., hardware and/or software configured to facilitate communications between a user and cluster management system 300). The interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the interface for cluster management system 300 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, the interface for cluster management system 300 is specified in one or more other languages, such as Java, C, or C++.

3. Clustering with Dynamically Locking Clusters

Figure 4:
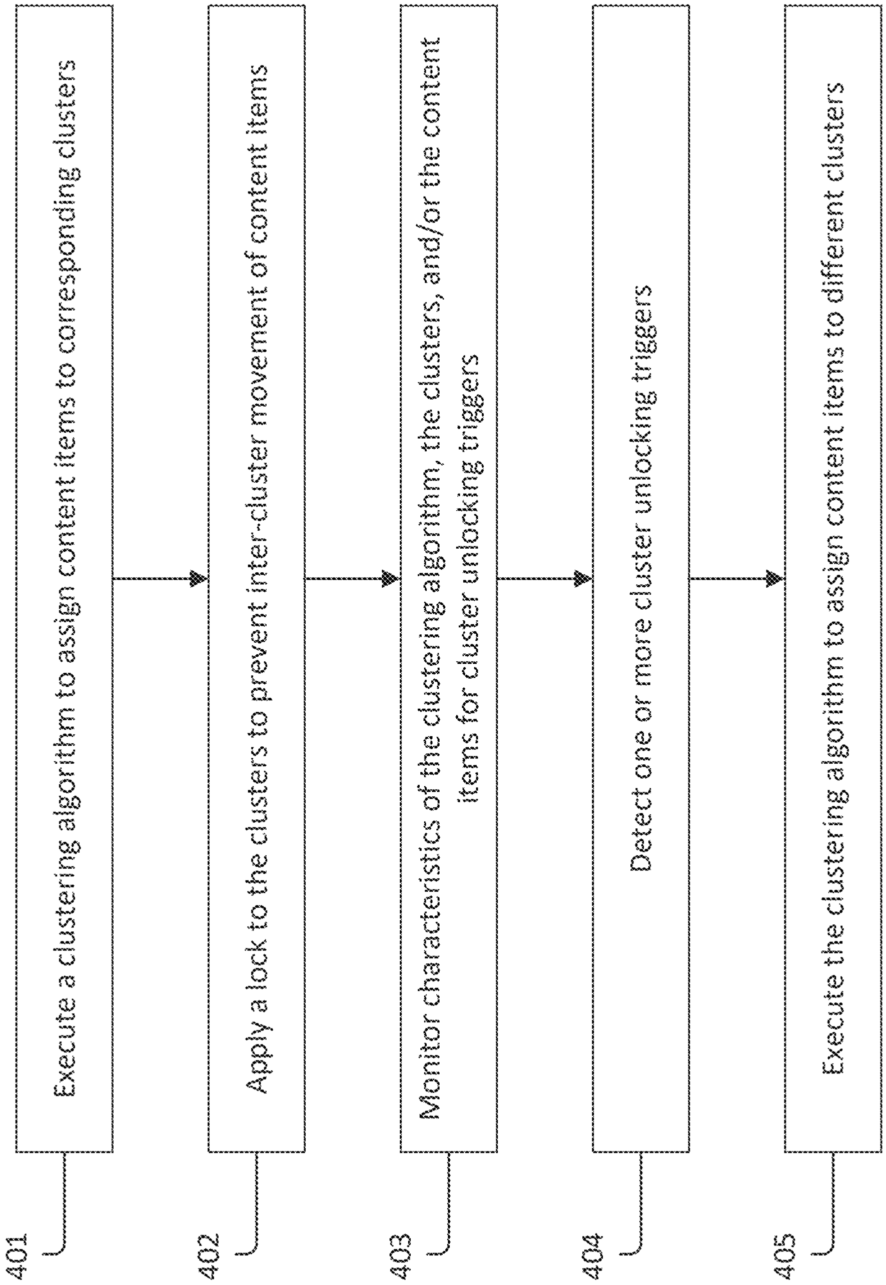
FIG. 4 illustrates an example set of operations for clustering content items with dynamically locking clusters in accordance with one or more embodiments.

FIG. 4 illustrates an example set of operations for clustering content items with dynamically locking clusters in accordance with one or more embodiments. One or more operations illustrated in FIG. 4 may be modified, rearranged, or omitted. Accordingly, the particular sequence of operations illustrated in FIG. 4 should not be construed as limiting the scope of one or more embodiments.

In an embodiment, the cluster management system 300 executes a clustering algorithm to assign content items to corresponding clusters (Operation 401). A variety of clustering algorithms may be used in different embodiments. In an embodiment, cluster management system 300 leverages the Term Frequency-Inverse Document Frequency (TF-IDF) technique to transform a collection of content items into numerical representations. TF-IDF quantifies the importance of a word in a document relative to its frequency across a corpus of content items. This statistical measure helps to reduce the dimensionality of textual data by focusing on the most significant words, thus enabling effective clustering operations. Each term's TF score is calculated by dividing the number of times the term appears in a content item by the total number of terms in that content item. The IDF is computed as the logarithm of the quotient of the total number of content items and the number of content items containing the term at least once.

In accordance with one or more embodiments, cluster management system 300 computes vectors for each content item by evaluating the TF-IDF scores for every term or select terms within the content item. For example, machine learning engine 100 may be trained to determine the terms that are more relevant than others, while less relevant terms may be excluded from the vector. In an embodiment, a list of less relevant terms may be stored in data repository 330 to be used for term exclusion. The vectors are multi-dimensional and represent the text content items in a vector space model. The dimensionality of these vectors corresponds to the number of distinct terms across content items in the dataset. The vector for each content item may become a sparse vector in a high-dimensional space, where most dimensions correspond to terms not present in the content item.

In accordance with one or more embodiments, cluster management system 300 uses cosine similarity to determine the similarity between two content item vectors. As previously discussed, cosine similarity evaluates the cosine of the angle between two vectors in the vector space, providing a measure of their orientation rather than magnitude. A cosine value closer to one signifies a smaller angle and greater similarity. The cluster management system 300 uses the cosine similarity metric to compare each content item vector against others to determine the content items that are similar enough to be grouped together. This similarity measure effectively ignores vector magnitude and focuses solely on the direction; this process helps identify content items with similar topics regardless of their length.

In accordance with one or more embodiments, cluster management system 300 assigns content items to clusters. Cluster assignment is based on proximity to cluster centroids. Cluster centroids are the central points of a cluster represented as vectors. Initially, these centroids can be selected by various methods, such as random selection, or more strategic choices, such as k-means++ initialization that can be used to improve cluster compactness by spreading out the initial centroids. Each content item is assigned to the cluster with a centroid that has the highest cosine similarity with the content item's vector, effectively grouping together content items that are directionally similar in the vector space.

In accordance with one or more embodiments, after the initial assignment of content items to clusters, an iterative refinement process begins. The centroids of the clusters are recalculated as the mean of the vectors of the content items currently assigned to each cluster. This recalculation potentially shifts the centroid to a more representative position within the cluster. Subsequently, content items are reassigned based on their cosine similarity to these new centroids. This iterative process continues until the assignments stabilize and no further significant movement of content items between clusters occurs, indicating convergence. This iterative process refines the clustering by optimizing the placement of centroids and minimizing the within-cluster sum of squares (WCSS).

In accordance with one or more embodiments, the boundaries of the clusters are not explicitly defined by rigid margins but are instead determined by the distribution and density of content item vectors within the cluster space. The extent to which a content item belongs to a cluster can be described by its similarity to the cluster centroid compared to its similarity to other centroids. Content items on the edges of a cluster might be closer in distance to centroids of neighboring clusters but not assigned to the neighboring clusters. The boundary of a cluster can thus be conceptualized as a fuzzy zone, where the membership probability of a content item is influenced by its relative similarity to nearby centroids.

In accordance with one or more embodiments, the boundary of a cluster may be more rigid and based on a distance from the centroid. In this configuration, each cluster is treated as a hypersphere with a defined radius in the vector space, and inclusion in the cluster is restricted to content items with vectors that fall within this radius from the centroid. This radius may be preconfigured or determined dynamically once the clusters reach initial stabilization. The radius represents an allowable cosine distance between the centroid and any content item within the cluster. Content items that do not fall within this distance threshold are either assigned to the nearest cluster for which they qualify or are designated as unclustered outliers if they do not meet the proximity criteria for any existing cluster. This approach introduces clear demarcations between clusters and can simplify the classification of content items.

In accordance with one or more embodiments, To determine the distance from the centroid that is appropriate for the cluster, cluster management system 300 may be tuned to generate a practical number of clusters. For example, business units relying on clusters may have different needs, so the cosine similarity required to include a content item in a cluster may be lower (more similar) for some business units and higher (less similar) for others. This may be balanced from use case to use case. Smaller clusters may be more manageable for some teams, while larger clusters (but fewer of them) may be more desirable for other teams. The clustering process previously discussed may be executed iteratively using new parameters until the desired number and size of clusters have been achieved.

In an embodiment, Hierarchical Agglomerative Clustering (HAC) is used to form clusters. Hierarchical Agglomerative Clustering (HAC) operates by initially treating each content item as its own cluster. Thus, if there are N items, there are initially N clusters. The algorithm computes the distance between each pair of clusters using a distance metric. At each iteration of the process, HAC merges the two clusters that are closest to each other, thereby reducing the number of clusters by one. This requires updating the distance matrix to reflect the distances between the newly merged cluster and the remaining clusters. This iterative merging continues until the content items are grouped into a single cluster or until a predetermined number of clusters is achieved. In an embodiment, cluster management system 300 is configured to stop merging clusters based on cluster membership. Cluster membership may be based on a percentage of content items from the set in a single cluster or a maximum number of content items assigned to the cluster.

In an embodiment, the merging continues, and cluster management system 300 stores cluster membership checkpoints to allow a manual selection of a cluster configuration based on a view of clusters at different iterations of the algorithm. For example, at iteration n, there may be 10 clusters; at n+1, there may be content item clusters; and at n+2, there may be 5 clusters. A user may review the checkpoints associated with these iterations and select the iteration that results in content item clusters (n+1). Cluster management system 300 then adopts the cluster membership associated with iteration n+1 based on the selection.

In an embodiment, the cluster management system 300 applies a lock to the clusters (Operation 402). Locking a cluster prevents inter-cluster movement of content items that are assigned to the locked cluster. This involves updating the metadata associated with each cluster and content item to reflect their new status, ensuring that the integrity and traceability of content are maintained throughout their lifecycle within the system. In an embodiment, metadata associated with clusters and cluster membership may be stored as cluster data 332 in data repository 330.

Locking/unlocking criteria 340 may be stored as locking/unlocking criteria 340 in data repository 330 as a mapping between a cluster-related state and an action (e.g., lock or unlock). For example, a cluster-related state indicating that a centroid associated with a cluster has experienced centroid drift that exceeds a pre-configured threshold may be mapped to an unlocking action. A cluster-related state indicating that the number of content items assigned to the first cluster has exceeded a maximum cluster membership threshold value may also be mapped to an unlocking action. A cluster-related state indicating that the number of content items assigned to the first cluster has fallen below a particular cluster membership minimum threshold value may also be mapped to an unlocking action.

In accordance with one or more embodiments, cluster management system 300 applies a lock to one or more clusters in response to detecting cluster locking criteria. One example of cluster locking criteria may include detecting the end of a clustering operation. For example, clustering may be performed on a pre-configured schedule (e.g., daily, hourly), and the the end of a clustering operation may trigger a locking operation, causing cluster management system 300 to lock one or more clusters. In particular, new clusters may be locked to avoid re-clustering of content items newly assigned to clusters. In another embodiment, a configuration flag may be set by an operator to trigger a locking operation. As another example, a cluster locking operation may be triggered when cluster membership reaches a pre-configured threshold. The threshold may be based on any metric. For example, a threshold configuration may indicate that once a certain percentage of content items being clustered are within a particular vector distance from a potential cluster centroid, a cluster should be established and locked using the potential centroid as the centroid of that cluster. In an embodiment, cluster locking criteria does not limit cluster membership or limit cluster centroid drift. However, by locking a cluster and establishing boundaries, the criteria for assigning a content item to the locked cluster control whether a content item is assigned to the cluster.

In accordance with one or more embodiments, a provisional cluster may be formed by provisionally assigning content items to an unlocked cluster during a clustering operation. If cluster locking criteria is not satisfied by the end of a cluster operation, the cluster will not be locked. For example, cluster locking criteria may indicate that provisional clusters should be locked at the end of each clustering operation if a minimum threshold of content items have been provisionally assigned to the provisional cluster. If the minimum threshold of content items has not been provisionally assigned to the provisional cluster, the cluster will not be locked. If the provisional cluster is not locked, content items provisionally assigned to the provisional cluster may be assigned to a different cluster during the next clustering operation.

By preventing movement between clusters, content items will consistently be associated with the same cluster once assigned to that cluster, ensuring that cluster-related metrics are not skewed by the movement of content items. To illustrate with an example, if 100 content items are initially associated with a particular cluster, movement between clusters might create an undesirable result by allowing 20 content items from the particular cluster to be assigned to a second cluster. Meanwhile, if 20 items from other clusters are assigned to the particular cluster during the same operation, the cluster membership would remain at 100. Since the cluster membership metric has not fluctuated in the example, the cluster membership metric will not serve as an indicator of the changes in cluster membership.

In accordance with one or more embodiments, new content items may be assigned to locked clusters. For example, a first set of content items may be assigned to an initial set of clusters. Once the initial assignment process has completed, the clusters may be locked. When a second set of content items is presented to cluster management systems for clustering, cluster management system 300 generates a vector for each of the new content items using the same vector structure. Since the same vector structure is used, there is no need to recalculate the vectors in the entire corpus. Instead, the new set of content items conforms to the initial set for clustering purposes. This method can be used to gain efficiency. In another embodiment, all vectors may be recalculated to accommodate the new dimensions added by the new content items.

In accordance with one or more embodiments, cluster management system 300 may add a content item to locked clusters by comparing the vector distance between the content item vector and the centroid vectors. If the distance meets a predetermined or dynamically generated threshold, the content item will be assigned to the appropriate cluster. If the distance meets a predetermined or dynamically generated threshold for more than one cluster, the content item will be assigned to the cluster with the centroid vector that is closest to the content item vector.

In accordance with one or more embodiments, after an additional set of content items has been assigned to a set of clusters (locked or unlocked), the centroid vector is recalculated for each centroid. This triggers a need to update the vector distance metrics that indicate the distance from each vector in a cluster to the newly calculated centroid. Once the new vector distance metrics have been recalculated, cluster management system 300 may determine new boundaries for the cluster, or a new cluster radius, to be used for future clustering activities.

In accordance with one or more embodiments, a boundary lock may also be established. A boundary lock is different than a cluster lock. While a cluster lock restricts a content item from changing clusters, a boundary lock establishes rigid boundaries for a cluster to ensure that the cluster does not expand in the vector space.

In an embodiment, the cluster management system 300 monitors characteristics of the clustering algorithm, the clusters, and/or the content items for cluster unlocking triggers (Operation 403). Cluster management system 300 accesses configuration data and other data to determine the conditions that are associated with locking and unlocking triggers. Cluster management system 300 then monitors the algorithm settings and data associated with clusters and content items to detect the conditions that are configured as triggers.

In an embodiment, the cluster management system 300 detects one or more cluster unlocking triggers (Operation 404). For example, if the clustering algorithm is altered in a significant way (e.g., no longer using the same vector structure), cluster management system 300 may register an unlocking trigger. In an embodiment, the algorithm may directly indicate a need for re-clustering, resulting in an unlocking trigger. An unlocking trigger may be stored in member or in cluster data 332, for example.

In accordance with one or more embodiments, cluster attributes may also be interpreted as triggers for unlocking one or more clusters. For example, cluster management system 300 may be configured to manage cluster size with a setting that indicates a minimum, maximum, or ideal cluster size. Boundary changes in a cluster may also trigger a need for re-clustering. This results in the generation of an unlocking trigger.

In accordance with one or more embodiments, a variety of scores may be used to determine if there is a need for re-clustering. A need for re-clustering would result in generating an unlocking trigger. For example, a silhouette score is computed by assessing both the mean intra-cluster distance that gauges the compactness of clusters and the mean nearest-cluster distance that measures the distance to the nearest cluster. This score ranges from −1 to +1. A silhouette score near +1 indicates that clusters are well-separated and compact, suggesting effective clustering. Scores near 0 suggest overlapping clusters, while negative values indicate that some clusters may be incorrectly assigned. A threshold for this score may be configured in an embodiment.

As another example, the Dunn Index (DI) is calculated by taking the ratio of the smallest distance between observations not in the same cluster to the largest intra-cluster distance. A higher DI indicates greater cluster validity, for it suggests clusters are compact and well-separated from each other. It is particularly useful for identifying sets of clusters that are distinct from each other while being tight internally. A threshold for this score may be configured in an embodiment.

As another example, the Davies-Bouldin Index (DBI) evaluates the average similarity between each cluster and its most similar cluster, where similarity is a function of the ratio of within-cluster distances to between-cluster distances. Ideally, for effective clustering, the DBI should be low, indicating that clusters are farther from each other and more compact. A threshold for this score may be configured in an embodiment.

As another example, a Within-Cluster Sum of Squares (WCSS) score measures the total squared variation of points within each cluster. It is often used in k-means clustering to find the optimal number of clusters by minimizing WCSS. A lower WCSS indicates that the clusters are tighter. Tighter clusters are typically desired in clustering scenarios. A threshold for this score may be configured in an embodiment.

As another example, the Calinski-Harabasz Index (CHI) calculates the ratio of the sum of between-cluster dispersion to within-cluster dispersion for the clusters. Higher values of this index suggest that the clustering configuration has well-separated and compact clusters, indicating a good clustering structure. A threshold for this score or any other score that generates insights about a cluster may be configured in an embodiment.

In accordance with one or more embodiments, cluster centroid drift may trigger a need for re-clustering, creating an unlocking trigger. For example, as content items are added to a particular locked cluster over time, the centroid vector associated with that cluster is re-calculated since the centroid vector represents a mean of the vectors in the cluster. Cluster management system 300 tracks the changes of the centroid vector over time to determine if the cluster centroid vector has drifted beyond a pre-configured distance from its initial location in the vector space. A trigger may be detected based on the distance between the initial centroid vector location and the current centroid vector location in an embodiment. In an embodiment, a trigger may be associated with a rate of cluster drift rather than the total drift distance. For example, if cluster drift rate increases by a particular amount or percentage, a trigger may be registered, indicating a need for re-clustering.

In accordance with one or more embodiments, characteristics of the content items may be interpreted as triggers for unlocking one or more clusters. For example, in an embodiment, once clusters are locked, the vector structure used for clustering is locked to ensure consistency with vector comparisons without the need to create new vectors for each content item. In such an embodiment, content items that are analyzed for clustering subsequent to the cluster locking operation may have a true content item vector different from the normalized content item vector that is eventually used for clustering. The normalization process includes removing dimensions of the true vector that are not part of the locked vector structure and adding dimensions to the true vector that are part of the locked vector structure but not part of the true vector. The vector is then ordered to match the locked vector structure in an embodiment. In an embodiment, the true vectors for each content item are maintained in cluster data 332, and an alternative true vector structure for the entire corpus is generated periodically (e.g., when new content items are clustered). The true vector structure is then compared to the locked vector structure periodically to compute a dimensional difference metric by comparing the difference in the number of dimensions between the two vector structures. A large dimensional difference metric may indicate a need to re-cluster content items because the current clusters are generated based on a smaller number of dimensions. In this case, a trigger may be registered, indicating a need for re-clustering.

In accordance with one or more embodiments, the content item vectors and the centroid vector for one or more clusters (and associated metrics) may be re-calculated to normalize the existing locked vector structure to the true vector structure for the entire corpus. Although this essentially includes placing null values or zeros in the place of the new dimension for already-assigned vectors, the vector structure change results in new vector distance metrics and a new centroid location. Cluster management system 300 may detect a change in vector distance between a content item's normalized vector and the new centroid vector that breaches a threshold requirement. For example, the distance between the content item vector and the centroid vector may be too far to be considered part of the cluster. This (or a configured number of these events) may result in the registration of a re-clustering trigger.

In an embodiment, the cluster management system 300 executes the clustering algorithm again to assign content items to different clusters (Operation 405). Cluster management system 300 unlocks one or more clusters. Unlocking a cluster involves updating the metadata associated with each cluster and content item to reflect their new status. Clusters will be marked as unlocked, and content items will be listed as unclustered. In an embodiment, one or more clusters will persist, and content items will be assigned to the best existing cluster. Alternatively, one or more clusters will not persist, and new clusters will be created when the clustering operation is executed by cluster management system 300. One or more content items associated with one cluster will be assigned to a different cluster during the execution of the clustering operation in an embodiment.

In accordance with one or more embodiments, locking and unlocking can occur for all clusters in a set of clusters. This can occur, for example, immediately after executing a clustering operation for the first time to associate a large set of content items with new clusters. However, locking and unlocking can occur on a cluster-by-cluster basis in one or more embodiments. For example, if there are four clusters in a set of clusters used to manage support tickets as content items, it may be appropriate to unlock only one of the clusters in the set if three of the clusters are healthy, and no triggers have been registered. This may be the case if the remaining cluster is associated with a registered trigger, indicating significant cluster centroid drift. In such a case, cluster management system 300 may unlock the cluster associated with the trigger and execute a clustering algorithm to assign content items to clusters in the set of clusters (or leave them unassigned).

In accordance with one or more embodiments, when a cluster is unlocked, content items associated with the unlocked cluster are flagged as unassigned. The clustering operation may then assign unassigned content items to appropriate clusters. In an embodiment, the unlocked cluster may retain its new centroid, revert to its original centroid, or be discarded in favor of generating a new cluster that may be more appropriate for the unclustered content items that remain after some of the unassigned content items become associated with other clusters.

In accordance with one or more embodiments, a cluster may have sub-clusters, and operations described herein that are associated with clusters may be performed on sub-clusters. For example, a cluster membership may grow to a substantial number, and rather than triggering a re-clustering operation, a sub-cluster operation may be triggered. In this case, cluster management system 300 performs an analysis on the content items associated with the parent cluster to generate sub-clusters. Although the same operations may be used, a cluster context identifier may be stored in cluster data 332. For example, clusters may be associated with a cluster type of "cluster;" clusters that have sub-clusters may be associated with a cluster type "parent cluster;" and sub-clusters may be associated with the type "sub-cluster." There is no limit to the number of levels of sub-clustering, so the context mapping may be expanded to support additional levels.

In accordance with one or more embodiments, a different configuration may be used for sub-clusters than the configuration used for clusters. For example, it is expected that the items in a cluster are related, so cluster management system 300 may be configured with biases that make sense in the context of sub-clusters. This could result, for example, in sub-clusters being based on time. In another embodiment, certain dimensions of the vector may be ignored or given more weight than other dimensions to produce sub-clusters. In other embodiments, the same clustering configuration used on the parent cluster may be used with the direction to generate a defined number of sub-clusters.

4. Label-Augmented Content Clustering

Figure 5:
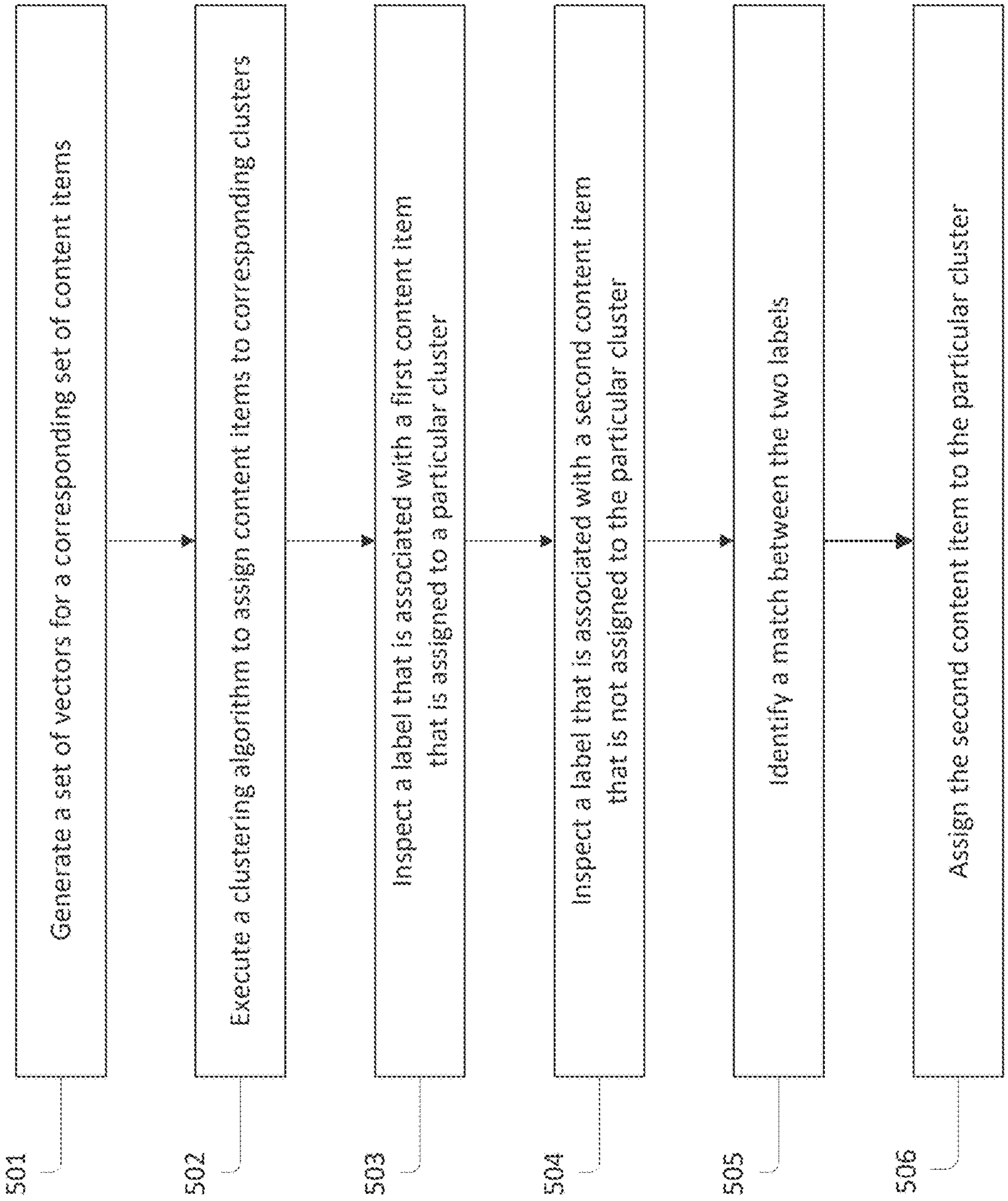
FIG. 5 illustrates an example set of operations for label-augmented content clustering in accordance with one or more embodiments.

FIG. 5 illustrates an example set of operations for label-augmented content clustering in accordance with one or more embodiments. One or more operations illustrated in FIG. 5 may be modified, rearranged, or omitted. Accordingly, the particular sequence of operations illustrated in FIG. 5 should not be construed as limiting the scope of one or more embodiments.

In an embodiment, the cluster management system 300 generates a set of vectors for a corresponding set of content items (Operation 501). As discussed previously, cluster management system 300 computes vectors for each content item by evaluating the TF-IDF scores for every term or select terms within the content item in an embodiment. Other methods may be used to generate vectors associated with the content items in an embodiment. These vectors are multi-dimensional and represent the text content items in a vector space model. The dimensionality of these vectors corresponds to the number of distinct terms across the content items in the dataset.

In an embodiment, the cluster management system 300 executes a clustering algorithm to assign content items to corresponding clusters (Operation 502). In an embodiment, cluster management system 300 leverages the Term Frequency-Inverse Document Frequency (TF-IDF) technique to transform a collection of content items into numerical representations. TF-IDF quantifies the importance of a word in a document relative to its frequency across a corpus of content items. This statistical measure helps to reduce the dimensionality of textual data by focusing on the most significant words, thus enabling effective clustering operations. Each term's TF score is calculated by dividing the number of times the term appears in a content item by the total number of terms in that content item. The IDF is computed as the logarithm of the quotient of the total number of content items and the number of content items containing the term at least once.

In accordance with one or more embodiments, cluster management system 300 uses cosine similarity to determine the similarity between two content item vectors. As previously discussed, cosine similarity evaluates the cosine of the angle between two vectors in the vector space, providing a measure of their orientation rather than magnitude. Cluster management system 300 uses this metric to assign content items to clusters. Initial cluster assignment is based on proximity to cluster centroids. Centroids are the central points of a cluster represented as vectors. Each content item is assigned to the cluster with a centroid that has the highest cosine similarity with the content item's vector, effectively grouping together content items that are directionally similar in the vector space.

In an embodiment, the cluster management system 300 inspects a label that is associated with a first content item that is assigned to a particular cluster (Operation 503). For example, a support ticket for a user experiencing connectivity issues may be associated with a label "connectivity." In an embodiment, more than one label may be associated with a content item. In an embodiment, cluster management system 300 is configured to review specific metadate to detect labels. In this case, cluster management system 300 detects a label associated with a first content item that is already associated with a cluster.

In an embodiment, the cluster management system 300 inspects a label that is associated with a second content item that is not assigned to the particular cluster (Operation 504). Once a clustering operation is complete, one or more content items may remain unclustered. This is the case when the similarity between the unclustered content item's vector is not similar enough to a cluster centroid vector (e.g., the vector distance between the content item vector and the cluster centroid vector does not meet a threshold requirement). In this case, the second content item is unclustered, but has a label.

In an embodiment, the cluster management system 300 identifies a match between the two labels (Operation 505). For example, the first (clustered) content item may be associated with the label "connectivity," and the second (unclustered) label may also be associated with the label "connectivity." In an embodiment, a label mapping is stored to identify labels that are similar to one another. For example, the mapping may indicate that the labels "connectivity" and "connection" match one another. This mapping may be consulted when determining if a match has occurred. In an embodiment, more than one label may match.

In an embodiment, the cluster management system 300 assigns the second content item to the particular cluster (Operation 506). Although the second content item was not initially assigned to the cluster based on a vector distance calculation, the content item will now be associated with the particular cluster based on label comparison.

In accordance with one or more embodiments, content items are provisionally assigned to clusters during the initial clustering phase, but the assignment is not committed until the label analysis is completed. For example, if a content item vector is slightly closer to the centroid of a first cluster than the centroid of a second cluster, the content item will be provisionally assigned to the first cluster. However, if the content item is associated with a label that matches one or more labels associated with content items assigned to the second cluster, the content item may be assigned to the second cluster.

In accordance with one or more embodiments, when a content item is provisionally assigned to a cluster, a cluster lock does not apply to that content item. Cluster management system 300 may be configured to ignore provisionally assigned content items when performing a clustering operation or may be configured to include the provisionally assigned content items in the clustering operation. In an embodiment, clustering rules may be used to indicate conditions that trigger the inclusion or exclusion of provisionally assigned content items in clustering operations. For example, a rule may indicate that if a content item was provisionally assigned to cluster as a result of performing a clustering operation and a label analysis has not yet been performed, the content item should remain provisionally assigned to the cluster. However, the rule may indicate that if a content item was provisionally assigned to cluster as a result of performing a clustering operation and a label analysis has already been performed, the content item should be included in the next clustering operation.

5. Dynamically Generating Clusters

Figure 6:
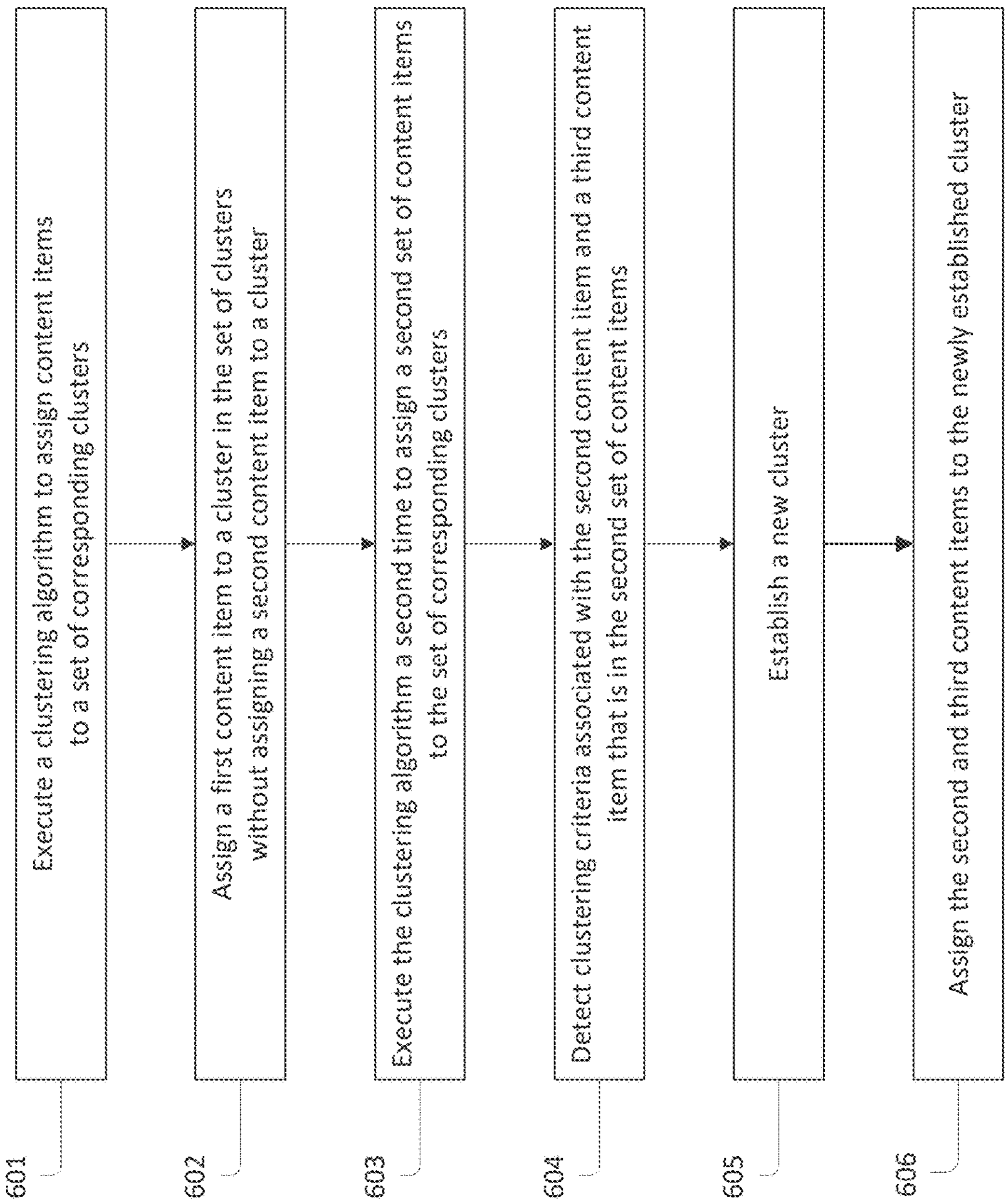
FIG. 6 illustrates an example set of operations for dynamically generating clusters in accordance with one or more embodiments.

FIG. 6 illustrates an example set of operations for dynamically generating clusters in accordance with one or more embodiments. One or more operations illustrated in FIG. 6 may be modified, rearranged, or omitted. Accordingly, the particular sequence of operations illustrated in FIG. 6 should not be construed as limiting the scope of one or more embodiments.

In an embodiment, the cluster management system 300 executes a clustering algorithm to assign content items to a set of corresponding clusters (Operation 601). In an embodiment, cluster management system 300 leverages the Term Frequency-Inverse Document Frequency (TF-IDF) technique to transform a collection of content items into numerical representations. Each term's TF score is calculated by dividing the number of times the term appears in a content item by the total number of terms in that content item. The IDF is computed as the logarithm of the quotient of the total number of content items and the number of content items containing the term at least once.

In accordance with one or more embodiments, cluster management system 300 uses cosine similarity to determine the similarity between two content item vectors. As previously discussed, cosine similarity evaluates the cosine of the angle between two vectors in the vector space, providing a measure of their orientation rather than magnitude. Cluster management system 300 uses this metric to assign content items to clusters. Initial cluster assignment is based on proximity to cluster centroids (the central points of a cluster represented as vectors). Each content item is assigned to the cluster with a centroid that has the highest cosine similarity with the content item's vector, effectively grouping together content items that are directionally similar in the vector space.

In an embodiment, the cluster management system 300 assigns a first content item to a cluster in the set of clusters without assigning a second content item to a cluster (Operation 602). For example, the clustering operation may be performed on a set of content items that includes the first content item and the second content item. During the clustering operation, cluster management system 300 assigns the first content items to the cluster. The assignment is based on the vector distance between the first content item's vector and the cluster's centroid vector. However, the clustering operation did not result in an assignment of the second content item, so the second content item remains unclustered (i.e., unassigned). The state of each content item may be stored by data repository 330, indicating if the content item is clustered, the cluster that the content item is associated with, and any other metadata associated with the content item and its state.

In an embodiment, the cluster management system 300 executes the clustering algorithm a second time to assign a second set of content items to the set of corresponding clusters (Operation 603). For example, a second set of content items that is different than the first set of content items may be selected for clustering. This can occur, for example, if a new set of content items (such as support tickets) has been created over a period of time since the last clustering operation was performed. During this second execution of the clustering operation, content items may be assigned, for example, to existing clusters. Others may be provisionally assigned, and others may remain unassigned.

In an embodiment, the cluster management system 300 detects clustering criteria associated with the second content item and a third content item that is in the second set of content items (Operation 604). For example, a comparison between the vector associated with the second content item and the vector associated with the third content item may indicate that the second and third content items are similar. Additionally, or alternatively, the similarity may be detected based at least in part on a match between a label associated with the second content item and a label associated with the third content item.

In an embodiment, the cluster management system 300 then establishes a new cluster (Operation 605). Cluster management system 300 is configured with rules that determine when new clusters should be formed. For example, if existing clusters are not appropriate for unclustered content items, but those content items are similar enough to be in the same cluster, cluster management system 300 may create a new cluster that is based on the similar unclustered content items. This is the case even though clusters have already been formed and locked. A configuration file may indicate that a minimum number of similar unclustered content items need to exist before generating a new cluster. The new cluster may be based on the second and third content item vectors that may be used to generate a centroid vector for the new cluster. Alternatively, the new cluster may be formed using the iterative approach to cluster formation previously described.

In an embodiment, the cluster management system 300 assigns the second and third content items to the newly established cluster (Operation 606). Other content items may also be assigned to the newly established cluster. For example, if the clustering operation is executed subsequent to the establishment of the new cluster, additional content items may be assigned to the new cluster.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
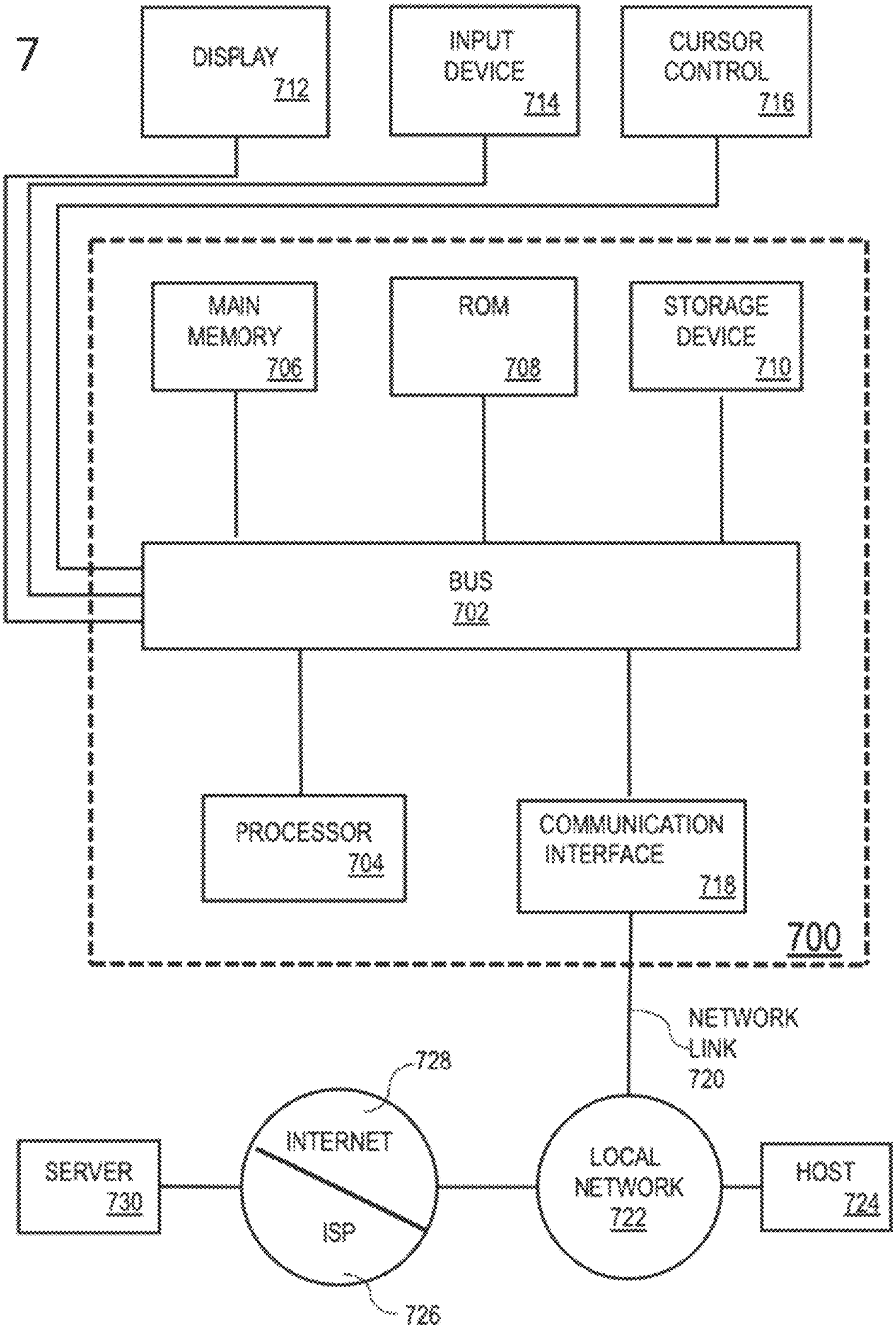
FIG. 7 shows a block diagram that illustrates a computer system in accordance with one or more embodiments.

For example, FIG. 7 is a block diagram that illustrates a computer system 700 upon which an embodiment of the disclosure may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or a Solid-State Drive (SSD) is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:

executing a clustering algorithm to assign each of a first plurality of content items to corresponding clusters of a first plurality of clusters;

applying a lock to the first plurality of clusters to update the state associated with each cluster of the first plurality of clusters to a locked state that controls how the clustering algorithm processes content items by preventing reassignment operations for clusters in a locked state;

wherein when the first plurality of clusters are in a locked state: any particular content item, from the first plurality of content items, that has been assigned to a corresponding cluster in the first plurality of clusters cannot be reassigned to another cluster;

monitoring, in real-time, characteristics associated with at least one of the clustering algorithm, the first plurality of clusters, or the first plurality of content items to determine whether one or more cluster unlocking criteria are met for one or more clusters of the first plurality of clusters, wherein the cluster unlocking criteria determine whether the clustering algorithm is permitted to perform further assignments;

responsive to determining that one or more cluster unlocking criteria are met for the one or more clusters of the first plurality of clusters:

applying the clustering algorithm to a second plurality of content items, from the one or more clusters, to assign each of the second plurality of content items to corresponding clusters of a second plurality of clusters.

2. The non-transitory computer-readable media of claim 1, wherein the operations further comprise:

unlocking a first cluster of the first plurality of clusters without unlocking a second cluster of the first plurality of clusters in response to determining (a) the one or more cluster unlocking criteria has been met with respect to the first cluster and (b) the one or more cluster unlocking criteria has not been met with respect to the second cluster.

3. The non-transitory computer-readable media of claim 2, wherein the cluster unlocking criteria includes one or more of:

a) determining that a number of content items are assigned to the first cluster, and that the number of content items assigned to the first cluster has exceeded a first cluster membership threshold value;

b) determining that the number of content items assigned to the first cluster has fallen below a second cluster membership threshold value;

c) determining that a centroid drift metric has exceeded a centroid drift threshold value.

4. The non-transitory computer-readable media of claim 3, wherein the cluster unlocking criteria includes determining that the centroid drift metric has exceeded the centroid drift threshold value, and the operations further comprise:

executing the clustering algorithm to assign each content item assigned to the first cluster to corresponding clusters of the second plurality of clusters;

applying a lock to one or more clusters of the second plurality of clusters to update the state associated with each cluster of the second plurality of clusters to a locked state.

5. The non-transitory computer-readable media of claim 1, wherein the second plurality of clusters includes one or more of the first plurality of clusters.

6. The non-transitory computer-readable media of claim 1, wherein the operations further comprise unlocking each cluster of the first plurality of clusters.

7. The non-transitory computer-readable media of claim 1, wherein the operations further comprise:

determining that a first label associated with a first content item assigned to a first cluster matches a second label associated with a second content item that is not assigned to the first cluster of the first plurality of clusters;

in response at least in part to determining that the first label and the second label match, assigning the second content item to the first cluster.

8. The non-transitory computer-readable media of claim 1, wherein the operations further comprise:

establishing an initial centroid value as the centroid value associated with a first cluster of the first plurality of clusters;

while the first cluster is in a locked state:

assigning a first content item to the first cluster;

establishing an updated centroid value as the centroid value for associated with the first cluster;

wherein the updated centroid value is calculated based at least in part on attributes of the first content item.

9. The non-transitory computer-readable media of claim 1, wherein the operations further comprise:

accessing a cluster log file that stores events associated with a third plurality of clusters, wherein the second plurality of clusters includes the first plurality of clusters;

accessing a locking log file that stores locking and unlocking events associated with the third plurality of clusters;

training a machine learning model to identify locking or unlocking criteria based at least in part on the cluster log file and the locking log file;

applying the machine learning model to automatically lock or unlock a cluster of the third plurality of clusters based on one or more of the identified locking or unlocking criteria.

10. The non-transitory computer-readable media of claim 1, wherein the operations further comprise:

unlocking a first cluster of the first plurality of clusters;

monitoring, in real-time, characteristics associated with at least one of the clustering algorithm, the first plurality of clusters, or the first plurality of content items to determine whether one or more cluster locking criteria are met for one or more clusters of the first plurality of clusters;

responsive to determining that one or more cluster locking criteria are met for the first cluster of the first plurality of clusters, applying a lock to the first cluster to update the state associated with each cluster of the second plurality of clusters to a locked state.

11. The non-transitory computer-readable media of claim 1, wherein when the first plurality of clusters are in a locked state: any particular content item, from the first plurality of content items, that has been assigned to a corresponding cluster in the first plurality of clusters cannot be reassigned to another cluster regardless of a distance of the particular content item from a centroid of the corresponding cluster.

12. A system comprising:

one or more hardware processors;

one or more non-transitory computer-readable media; and program instructions stored on the one or more non-transitory computer-readable media which, when executed by the one or more hardware processors, cause the system to perform operations comprising:

executing a clustering algorithm to assign each of a first plurality of content items to corresponding clusters of a first plurality of clusters;

applying a lock to the first plurality of clusters to update the state associated with each cluster of the first plurality of clusters to a locked state that controls how the clustering algorithm processes content items by preventing reassignment operations for clusters in a locked state;

wherein when the first plurality of clusters are in a locked state: any particular content item, from the first plurality of content items, that has been assigned to a corresponding cluster in the first plurality of clusters cannot be reassigned to another cluster;

monitoring, in real-time, characteristics associated with at least one of the clustering algorithm, the first plurality of clusters, or the first plurality of content items to determine whether one or more cluster unlocking criteria are met for one or more clusters of the first plurality of clusters, wherein the cluster unlocking criteria determine whether the clustering algorithm is permitted to perform further assignments;

responsive to determining that one or more cluster unlocking criteria are met for the one or more clusters of the first plurality of clusters:

applying the clustering algorithm to a second plurality of content items, from the one or more clusters, to assign each of the second plurality of content items to corresponding clusters of a second plurality of clusters.

13. The system of claim 12, wherein the operations further comprise:

unlocking a first cluster of the first plurality of clusters without unlocking a second cluster of the first plurality of clusters in response to determining (a) the one or more cluster unlocking criteria has been met with respect to the first cluster and (b) the one or more cluster unlocking criteria has not been met with respect to the second cluster.

14. The system of claim 13, wherein the cluster unlocking criteria includes one or more of:

a) determining that a number of content items are assigned to the first cluster, and that the number of content items assigned to the first cluster has exceeded a first cluster membership threshold value;

b) determining that the number of content items assigned to the first cluster has fallen below a second cluster membership threshold value;

c) determining that a centroid drift metric has exceeded a centroid drift threshold value.

15. The system of claim 14, wherein the cluster unlocking criteria includes determining that the centroid drift metric has exceeded the centroid drift threshold value, and the operations further comprise:

executing the clustering algorithm to assign each content item assigned to the first cluster to corresponding clusters of the second plurality of clusters;

applying a lock to one or more clusters of the second plurality of clusters to update the state associated with each cluster of the second plurality of clusters to a locked state.

16. The system of claim 12, wherein the second plurality of clusters includes one or more of the first plurality of clusters.

17. The system of claim 12, wherein the operations further comprise unlocking each cluster of the first plurality of clusters.

18. The system of claim 12, wherein the operations further comprise:

determining that a first label associated with a first content item assigned to a first cluster matches a second label associated with a second content item that is not assigned to the first cluster of the first plurality of clusters;

in response at least in part to determining that the first label and the second label match, assigning the second content item to the first cluster.

19. The system of claim 12, wherein the operations further comprise:

establishing an initial centroid value as the centroid value associated with a first cluster of the first plurality of clusters;

while the first cluster is in a locked state:

assigning a first content item to the first cluster;

establishing an updated centroid value as the centroid value for associated with the first cluster;

wherein the updated centroid value is calculated based at least in part on attributes of the first content item.

20. The system of claim 12, wherein the operations further comprise:

accessing a cluster log file that stores events associated with a third plurality of clusters, wherein the second plurality of clusters includes the first plurality of clusters;

accessing a locking log file that stores locking and unlocking events associated with the third plurality of clusters;

training a machine learning model to identify locking or unlocking criteria based at least in part on the cluster log file and the locking log file;

applying the machine learning model to automatically lock or unlock a cluster of the third plurality of clusters based on one or more of the identified locking or unlocking criteria.

21. The system of claim 12, wherein the operations further comprise:

unlocking a first cluster of the first plurality of clusters;

monitoring, in real-time, characteristics associated with at least one of the clustering algorithm, the first plurality of clusters, or the first plurality of content items to determine whether one or more cluster locking criteria are met for one or more clusters of the first plurality of clusters;

responsive to determining that one or more cluster locking criteria are met for the first cluster of the first plurality of clusters, applying a lock to the first cluster to update the state associated with each cluster of the second plurality of clusters to a locked state.

22. The system of claim 12, wherein when the first plurality of clusters are in a locked state: any particular content item, from the first plurality of content items, that has been assigned to a corresponding cluster in the first plurality of clusters cannot be reassigned to another cluster regardless of a distance of the particular content item from a centroid of the corresponding cluster.

23. A method comprising:

executing a clustering algorithm to assign each of a first plurality of content items to corresponding clusters of a first plurality of clusters;

applying a lock to the first plurality of clusters to update the state associated with each cluster of the first plurality of clusters to a locked state that controls how the clustering algorithm processes content items by preventing reassignment operations for clusters in a locked state;

wherein when the first plurality of clusters are in a locked state: any particular content item, from the first plurality of content items, that has been assigned to a corresponding cluster in the first plurality of clusters cannot be reassigned to another cluster;

monitoring, in real-time, characteristics associated with at least one of the clustering algorithm, the first plurality of clusters, or the first plurality of content items to determine whether one or more cluster unlocking criteria are met for one or more clusters of the first plurality of clusters, wherein the cluster unlocking criteria determine whether the clustering algorithm is permitted to perform further assignments;

responsive to determining that one or more cluster unlocking criteria are met for the one or more clusters of the first plurality of clusters:

applying the clustering algorithm to a second plurality of content items, from the one or more clusters, to assign each of the second plurality of content items to corresponding clusters of a second plurality of clusters;

wherein the method is performed by at least one device including a hardware processor.

24. The method of claim 23, wherein the operations further comprise:

unlocking a first cluster of the first plurality of clusters without unlocking a second cluster of the first plurality of clusters in response to determining (a) the one or more cluster unlocking criteria has been met with respect to the first cluster and (b) the one or more cluster unlocking criteria has not been met with respect to the second cluster.

25. The method of claim 24, wherein the cluster unlocking criteria includes one or more of:

a) determining that a number of content items are assigned to the first cluster, and that the number of content items assigned to the first cluster has exceeded a first cluster membership threshold value;

b) determining that the number of content items assigned to the first cluster has fallen below a second cluster membership threshold value;

c) determining that a centroid drift metric has exceeded a centroid drift threshold value.

26. The method of claim 25, wherein the cluster unlocking criteria includes determining that the centroid drift metric has exceeded the centroid drift threshold value, and the operations further comprise:

executing the clustering algorithm to assign each content item assigned to the first cluster to corresponding clusters of the second plurality of clusters;

applying a lock to one or more clusters of the second plurality of clusters to update the state associated with each cluster of the second plurality of clusters to a locked state.

27. The method of claim 23, wherein the second plurality of clusters includes one or more of the first plurality of clusters.

28. The non-transitory computer-readable media of claim 23, wherein the operations further comprise unlocking each cluster of the first plurality of clusters.

29. The method of claim 23, wherein the operations further comprise:

determining that a first label associated with a first content item assigned to a first cluster matches a second label associated with a second content item that is not assigned to the first cluster of the first plurality of clusters;

in response at least in part to determining that the first label and the second label match, assigning the second content item to the first cluster.

30. The method of claim 23, wherein the operations further comprise:

establishing an initial centroid value as the centroid value associated with a first cluster of the first plurality of clusters;

while the first cluster is in a locked state:

assigning a first content item to the first cluster;

establishing an updated centroid value as the centroid value for associated with the first cluster;

wherein the updated centroid value is calculated based at least in part on attributes of the first content item.

31. The method of claim 23, wherein the operations further comprise:

accessing a cluster log file that stores events associated with a third plurality of clusters, wherein the second plurality of clusters includes the first plurality of clusters;

accessing a locking log file that stores locking and unlocking events associated with the third plurality of clusters;

training a machine learning model to identify locking or unlocking criteria based at least in part on the cluster log file and the locking log file;

applying the machine learning model to automatically lock or unlock a cluster of the third plurality of clusters based on one or more of the identified locking or unlocking criteria.

32. The method of claim 23, wherein the operations further comprise:

unlocking a first cluster of the first plurality of clusters;

monitoring, in real-time, characteristics associated with at least one of the clustering algorithm, the first plurality of clusters, or the first plurality of content items to determine whether one or more cluster locking criteria are met for one or more clusters of the first plurality of clusters;

responsive to determining that one or more cluster locking criteria are met for the first cluster of the first plurality of clusters, applying a lock to the first cluster to update the state associated with each cluster of the second plurality of clusters to a locked state.

33. The method of claim 23, wherein when the first plurality of clusters are in a locked state: any particular content item, from the first plurality of content items, that has been assigned to a corresponding cluster in the first plurality of clusters cannot be reassigned to another cluster regardless of a distance of the particular content item from a centroid of the corresponding cluster.

* * * * *